US010713219B1

United States Patent
Davidson et al.

(10) Patent No.: US 10,713,219 B1
(45) Date of Patent: *Jul. 14, 2020

(54) METHODS AND APPARATUS FOR DYNAMIC IMAGE ENTRIES

(71) Applicant: Yearbooker, Inc., New York, NY (US)

(72) Inventors: Robert Davidson, New York, NY (US); Fanny Chung Davidson, New York, NY (US)

(73) Assignee: Yearbooker, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,954

(22) Filed: Apr. 11, 2017

Related U.S. Application Data

(63) Continuation-in-part of application No. 14/535,270, filed on Nov. 6, 2014, now Pat. No. 9,030,496.

(60) Provisional application No. 62/320,663, filed on Apr. 11, 2016, provisional application No. 62/012,386, filed on Jun. 15, 2014, provisional application No. 61/971,493, filed on Mar. 27, 2014, provisional application No. 61/901,042, filed on Nov. 7, 2013.

(51) Int. Cl.
| | |
|---|---|
| *G06F 16/16* | (2019.01) |
| *H04L 29/08* | (2006.01) |
| *G06T 13/80* | (2011.01) |
| *G06T 11/60* | (2006.01) |
| *G06Q 50/00* | (2012.01) |

(52) U.S. Cl.
CPC .......... *G06F 16/168* (2019.01); *G06T 11/60* (2013.01); *G06T 13/80* (2013.01); *H04L 67/306* (2013.01); *G06Q 50/01* (2013.01); *G06T 2200/24* (2013.01)

(58) Field of Classification Search
CPC ... G06F 17/30126; G06T 13/80; G06T 11/60; G06T 2200/24; H04L 67/306; G06Q 50/01

See application file for complete search history.

(56) References Cited

U.S. PATENT DOCUMENTS

| 6,738,154 | B1 | 5/2004 | Venable | |
|---|---|---|---|---|
| 8,862,995 | B1* | 10/2014 | Kuhne | G06F 16/78 715/723 |
| 9,030,496 | B1 | 5/2015 | Davidson et al. | |
| 2002/0122067 | A1* | 9/2002 | Geigel | G06F 17/30265 715/788 |
| 2005/0030315 | A1* | 2/2005 | Cohen | G06T 11/60 345/538 |

(Continued)

FOREIGN PATENT DOCUMENTS

WO     2013033664 A2     3/2013

OTHER PUBLICATIONS

"How to add the temperature on Instragram", accessed on Jan. 31, 2020, accessed from , 1-3 (Year: 2020).

*Primary Examiner* — Nicholas Klicos
(74) *Attorney, Agent, or Firm* — Joseph P. Kincart; Rogers Towers, P.A.

(57) ABSTRACT

The present disclosure provides for image processing apparatus for generating static image data and corresponding Spatial Coordinates as an infrastructure for receiving dynamic imagery input overlaid on the static image data. The dynamic imagery input will generally be related to the static image data and also correspond with selected Spatial Coordinates. The dynamic imagery is based upon an environmental condition experienced by at least one of a generating device and a displaying device.

14 Claims, 20 Drawing Sheets

(56) References Cited

U.S. PATENT DOCUMENTS

| | | |
|---|---|---|
| 2005/0134939 A1 | 6/2005 | Ikeda et al. |
| 2006/0047547 A1 | 3/2006 | Ekker et al. |
| 2008/0088646 A1 | 4/2008 | Sako et al. |
| 2010/0026698 A1 | 2/2010 | Reville et al. |
| 2010/0070572 A1 | 3/2010 | Olson et al. |
| 2011/0148916 A1 | 6/2011 | Blattner |
| 2012/0179571 A1 | 7/2012 | Grosso |
| 2012/0233253 A1* | 9/2012 | Ricci ................ G06Q 30/0241 709/204 |
| 2012/0239528 A1 | 9/2012 | Nakagawa |
| 2012/0269380 A1 | 10/2012 | Crookham et al. |
| 2012/0278391 A1* | 11/2012 | Olson ................ G06Q 10/10 709/204 |
| 2012/0331371 A1 | 12/2012 | Larson et al. |
| 2013/0080897 A1* | 3/2013 | Han ................ G11B 27/034 715/723 |
| 2014/0080456 A1 | 3/2014 | Nunn et al. |
| 2014/0181715 A1* | 6/2014 | Axelrod ............. G06F 3/0487 715/771 |
| 2014/0285402 A1 | 9/2014 | Rahman et al. |
| 2015/0143256 A1* | 5/2015 | Panchawagh-Jain ........................ H04L 51/08 715/752 |
| 2015/0242706 A1 | 8/2015 | Brown |
| 2017/0289234 A1 | 10/2017 | Andreou et al. |
| 2018/0350144 A1* | 12/2018 | Rathod ............. G06Q 20/3276 |

* cited by examiner

| | | 109A |
|---|---|---|
| 1. | TEMPERATURE | |
| 2. | ACCELERATION (AND DIRECTION) | |
| 3. | SPEED | |
| 4. | VIBRATION | |
| 5. | LOCATION | |
| 6. | ALTITUDE | |
| 7. | NUMBER OF PEOPLE PROXIMATE (INFRA-RED) | |
| 8. | DEMOGRAPHICS (AGE) | |
| 9. | WEATHER (BASED UPON LOCATION) | |
| 10. | TIME OF DAY | |
| 11. | TIME OF YEAR | | http://www...

MEMORY-E-BOOK WEB    MARY'S ACCOUNT    LOG OUT

428

BOOK INFO AND INVITATIONS
MEMORYBOOK: HUNTER — 402
2014 — 404
BOOK INFO —| INVITATIONS — 406

PERSONALIZED INVITATION MESSAGE
430

GRADE/CLASS
432

EMAIL    STUDENT FIRST NAME    STUDENT LAST NAME
434
436
438
440
442    > ADD MORE ROWS — 446
444    > UPLOAD EXCEL

SEND INVITATIONS — 448

FIG. 4B

| | | |
|---|---|---|
| 1301 |  | This kitten image is placed on screen as an action or message on a mobile device (or hardware enabled) |
| 1302 |  | Tilting a motion sensor-enabled device to the left triggers eye and face changes in the graphic to appear to keep it's eyes on the user |
| 1303 |  | Shake the device and the graphic acknowledges the shake |
| 1304 |  | Take the device outdoors or into very bright light and it is shown with sunglasses |
| 1305 |  | Swipe downward from it's forehead to its nose as if to pet it and it responds affectionately |
| 1306 |  | Stop interacting with the device and it "goes to sleep" |

FIG. 13

METHODS AND APPARATUS FOR DYNAMIC IMAGE ENTRIES

CROSS REFERENCE TO RELATED APPLICATIONS

The present application claims priority to pending application Ser. No. 14/535,270 entitled METHODS FOR AND APPARATUS FOR INTERACTIVE SCHOOL YEARBOOK and filed Nov. 6, 2014 as a Continuation in Part application, which in turn claims priority to provisional patent application Ser. No. 61/901,042, filed Nov. 7, 2013, entitled, "METHODS FOR AND APPARATUS FOR INTERACTIVE SCHOOL YEARBOOK"; and also in turn claims priority to provisional patent application Ser. No. 61/971,493, filed Mar. 27, 2014, entitled, "METHODS FOR AND APPARATUS FOR INTERACTIVE SCHOOL YEARBOOK"; and also in turn claims priority to provisional patent application Ser. No. 62/012,386, filed Jun. 15, 2014, entitled, "METHODS FOR AND APPARATUS FOR INTERACTIVE SCHOOL YEARBOOK". The subject matter of each of the foregoing documents is relied upon and incorporated herein by reference.

FIELD OF THE DISCLOSURE

The present disclosure relates to image processing apparatus for generating static image data with dynamic environment based imagery overlays placed at corresponding Spatial Coordinates and based upon media input from a user which becomes animated based upon environmental conditions of one or both of the place input and the place of display.

BACKGROUND OF THE DISCLOSURE

Digital documents, including memory books, have taken on many forms as people seek to memorialize various events and timeframes of their lives. Organization yearbooks, camp memory books, military books and other volumes typically include photos and text describing people and events associated with a traditional class. Organization yearbooks generally carry images of people in an organization and are distributed as mementos towards the end of an organization event or year.

Typically, memory books are signed during the last days of organizational time period with brief memory book entries to other members. Each signer may select a place to "sign" another's book and make their entry with a marker or other writing instrument. Book owners have the ability to allow or not allow another to sign their memory book, since the physical book is in their possession and they need not hand it over to anyone else for signing. Once an event is complete content is rarely added to a memory book. The memory book takes on a time capsule quality. Other types of memory books include family albums, anniversary albums company albums or other volumes.

With the advent of personal computers, mobile phones and tablets, digital social media has provided an alternative to memory books. However, social media is generally open to a large group of people with essentially no time limitation. Social media also includes many subjects that go beyond an organization experience. What is needed therefore is a digital medium to capture and enhance a discrete experience.

SUMMARY OF THE DISCLOSURE

Accordingly, the present disclosure provides for image processing apparatus for generating static image data and corresponding Spatial Coordinates as an infrastructure for receiving media input that includes imagery that becomes dynamic based upon physical environmental conditions experienced by one or both of a local device used to generate the dynamic imagery and a device used to display the imagery.

In some embodiments, static image data may replicate pages of a physical memory book. Memorybook Entries including media input will generally correspond to a digital "signing" of a Recipient's digital device and may include one or more of: a memory book (including multiple forms of media as opposed to traditional "writing" placed in traditional hard copy memory book) a digital communication, and an electronic document. As such the dynamic media input is generally related to the image data corresponding with selected Spatial Coordinates. Dynamic media input becomes animated based upon physical conditions experienced by a device upon which the dynamic media is generated and or on a device upon which it is displayed may include, for example, an animation that changes appearance based upon environmental conditions, including one or more of: motion, heat, humidity or other physical condition registered by the device controlling display of the imagery.

In sent embodiments, a static image may be a communication sent from a first user to a second user that is generally static in nature, such as an email message or a text message, and dynamic media may be overlaid on a static screen.

Physical conditions experienced by the device upon which the imagery is displayed may include an environmental condition the device is exposed to. Environmental conditions that drive interactive movement and visualization of overlaid imagery may be triggered by, or otherwise based upon hardware sensors and may therefore include, for example: a motion coprocessor, accelerometer, gyroscopes, barometer, thermometer, CCD camera, light sensor, a moisture sensor, a compass, GPS, altitude calculations, micro location (beacons), ambient light sensors, proximity sensors, biometric sensors (fingerprint), voice activation, touch-gestures and duration on screen.

In some embodiments, the present disclosure includes a digital version of a memory book, which may include a school yearbook or an event book that corresponds with an event or time period.

Unlike social media, the Interactive Memorybook provides methods and apparatus to memorialize static images and private communications, essentially recreating a physical volume. In addition, the Interactive Memorybook goes beyond pen and ink as a recording medium and provides for more modern recording mediums, such as, for example, one or more of: a multi view digital image, a selfie with dimensional qualities, a voice over, an audio clip, a video clip, a digital time capsule of information that may only be opened at a later date, and a notification function that communicates to a signer when their message is being viewed.

According to the present disclosure, an image capture device or image generating device creates a static image of a page in a digital format, such as Adobe™ portable document format ("pdf format"). The static layout is mapped according to a Cartesian Coordinate such as, for example an X, Y coordinate or a vector value in combination with a start point and an angle. As a cursor passes over a static image, an opportunity to make an Interactive Memorybook Entry associated with the particular coordinates is presented to a Memorybook Signer. As such, a Memorybook Signature is a private communication from the Memorybook Signer to the Memorybook Owner that is associated with a particular place in the Memory book. The place in the Interactive Memorybook is designated according to a page and Cartesian Coordinate. In this manner, an Interactive Memorybook emulates a physical memory book. It includes private communication from a first person to a second person in the context of a specific pint of a memory book, and the Memorybook is associated with a specific academic organization year.

Additional embodiments may include other volumes associated with a specific event in time or period of time. Examples include a wedding, an anniversary, a reunion, company team building event, a religious confirmation, a bar mitzvah, a bat mitzvah, a baptism, a work project, or other event including renditions of static physical volumes and digital interactive communications.

According to some embodiments, a Memorybook enabling apparatus includes a digital server accessible with a network access device via a digital communications network and executable software stored on the server and executable on demand. The software is operative with the server to cause the apparatus to transmit over the digital communications network a Memorybook interface comprising a plurality of images. The server will receive a designation of a Signing User and one or more dynamic images, which may be based upon an environmental condition. The server will also receive a media input and a Cartesian Coordinate associated with the media input.

A system of one or more computers can be configured to perform particular operations or actions by virtue of having software, firmware, hardware, or a combination of them installed on the system that in operation causes the system to perform specific actions, such as receive sensor input, execute method steps based upon the sensor input. One or more computer programs can be configured to perform particular operations or actions by virtue of including instructions that, when executed by data processing apparatus, cause the apparatus to perform the actions.

BRIEF DESCRIPTION OF THE DRAWINGS

The accompanying drawings are incorporated in and constitute a part of this specification, illustrate several embodiments of the disclosure and, together with the description, serve to explain the principles of the disclosure:

FIG. 4B illustrates a web interface viewed by the main contact, the web interface includes functionalities that may be used to implement some embodiments of the present disclosure.

FIG. 13 illustrates types of dynamic imagery and functionality according to some implementations of the present invention.

DETAILED DESCRIPTION

Figure 1A:
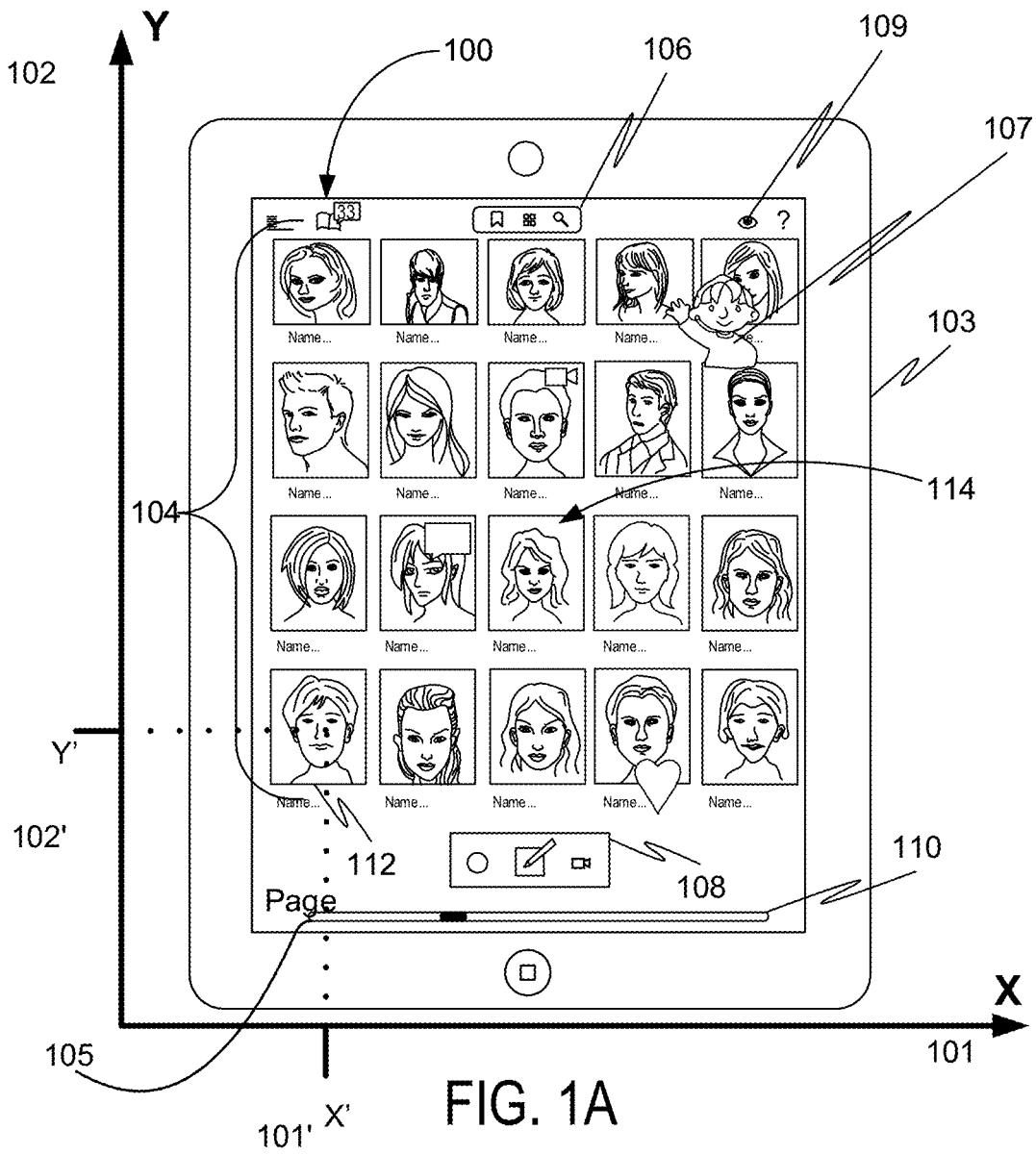
FIG. 1A illustrates block diagrams of exemplary user interfaces including functionalities that may be used to implement some embodiments of the present disclosure.

The present disclosure provides for apparatus and methods to generate static images, such as a static Memorybook, and associate dynamic image entries with a static image based upon an environmental condition. The dynamic image entry may be placed at a spatial designation within the generated image. In some embodiments, a dynamic image entry may be presented as a transparent overlay and aligned with static Memorybook page content.

The static image entries and the dynamic image entries are each aligned via spatial coordinates, and the dynamic image entries may become animated based upon an environmental condition ambient to a device that is used to generate the dynamic image entry and/or an environmental condition ambient to a device that is used to display the dynamic image entry.

In general, an image capture device or image generating device creates a static image of a page in a digital format, such as Adobe™ portable document format ("pdf format"). The static image is associated with a system of spatial coordinates, such as Cartesian Coordinates or Polar Coordinates. For example, X, Y coordinates or a vector value in combination with a start point and an angle. As a cursor passes over a static image, an opportunity to make an Interactive Memorybook Entry associated with particular coordinates associated with a position of a cursor is presented to a Memorybook Signer. An entered Memorybook Signature is a private communication between a Memorybook Signer and Memorybook Owner that is associated with a particular place in the Memory book. The place in the Interactive Memorybook is designated according to a page and Spatial Coordinate. In this manner, an Interactive Memorybook emulates a physical memory book. It includes private communication from a first person to a second person in the context of a specific point of a memory book, and the Memorybook is associated with a specific academic organization year.

In some embodiments, a Memorybook index may associate a page and Spatial Coordinate with a subject. A subject matter may be a person's name, such as a family member or work colleague or faculty member's name; a group, such as department in and organization, a division, a location or other category. A dynamic image may be placed upon the spatial coordinate of the subject.

In some embodiments, an apparatus includes mobile device, such as a tablet or a mobile phone, a computer server accessible with a network access device via a digital communications network and executable software stored on the apparatus and executable on demand. The software operative with the apparatus to cause the apparatus to transmit over the digital communications network a Memorybook interface comprising a plurality of images, receive via the digital communications network a designation of Signing User selected image comprising the plurality of images, receive via the digital communications network an Cartesian Coordinate Communication associated with the Signing User selected image, receive via the digital communications network a suggested placement position of the Cartesian Coordinate Communication in the Memorybook interface, determine at least one user associated with the selected image and generate a Memorybook interface comprising the image and the Cartesian Coordinate Communication associated with the selected image, said Memorybook interface comprising the image and the Cartesian Coordinate Communication being available upon request to the at least one user associated with the selected image.

In some embodiments, Memorybook automated apparatus includes a processor and executable software, executable upon demand to allow a user to provide a Memorybook Entry on a student or other subject matter associated with a Spatial Coordinate.

In some embodiments, apparatus receives Memorybook Entry communications data and displays the resulting messages at places indicated in the receivers' digital memory book, provided the permission is granted by the receiver.

Executable software may be operative in conjunction with a processor to execute methodologies that display the resulting provide a Memorybook Entries or communication of personal expression.

In some embodiments, an apparatus is disclosed capable of embodying the innovative concepts described herein. Image presentation can be accomplished via any multimedia type interface. Embodiments can therefore include a PC, handheld, game controller; tablet, PDA, cellular or other mobile or handheld device, HDTV or other multimedia device with user interactive controls, including, in some embodiments, voice activated interactive controls.

Glossary

As used herein the following terms will have the following associated meaning:

"Dynamic Memorybook Entry" or "dynamic image entry" as used herein is a formation of image data content that is animated and corresponds with a Spatial Coordinate and a page of a static media volume associated with a media owner. The Dynamic Memorybook Entry may be animated based upon an environment in which a device used to generate or display the Dynamic Memory Book Entry.

"Main Contact" as used herein includes an organization representative, a human resource representative and a family coordinator. In some embodiments, a main contact is endowed with administrator rights to the Memorybook Web Server.

"Memorybook" as used herein refers a collection of digital images, each respective image emulating a page from a physical memory book and associated with multiple areas identifiable via Spatial Coordinates. Memorybook Entries may be associated with the areas identifiable via Spatial Coordinates.

"Memorybook", "Digital Memory book" or "Virtual Memory book" as used herein means a user interface displaying static images associated with one or more of: work colleagues, family members and activities of an organization or familial group over a specified period of time. The user interface includes user interactive areas that allow users to interact with the memory book; for example, choose a page of the Memorybook to display and provide a Memorybook Entry on particular spatial coordinates.

"Mobile device" as used herein is a wireless mobile communications network access device for accessing a server in logical communication with a communications network. The mobile device may include one or more of a cellular, mobile or CDMA/GSM device, a wireless tablet phones, personal digital assistants (PDAs), "Mobile network" as used herein includes 2G, 3G, 4G internet systems and wireless fidelity (Wi-Fi), Wireless Local Area Network (WLAN), Worldwide Interoperability for Microwave Access (Wi-MAX), Global Mobile System (GSM) cellular network, spread spectrum and CDMA systems, Time division multiple access (TDMA), and Orthogonal frequency-division multiplexing (OFDM). The mobile device is capable of communicating over one or more mobile network. A mobile device may also serve as a network access device.

"Network Access Device" as used herein refers to an electronic device with a human interactive interface capable of communicating with a Network Server via a digital communications network.

"One-to-One" as used herein refers to a Memorybook Entry that is recorded by one user directly on to a media volume, such as a Memorybook, of a second user and is not accessible by third party users.

"Spatial Coordinate" as used herein refers to a designation of a particular location on a page. Specific examples of Spatial Coordinate include Cartesian Coordinates and Polar Coordinates.

"Static Memorybook Entry" sometimes referred to as a "static entry" as used herein is a recorded Communication that corresponds with a Spatial Coordinate and page of a static media volume associated with a media owner. Examples of Static Memorybook Entries include one or more of: a text, a voice to text entry, a video segment, an audio file, an animation, an emoticon, a sticker, a finger paint, and a free-style drawing such as an autograph made with a digital finger paint or stylus-based digital paint and draw tools. In preferred embodiments, a Static Memorybook Entry is a one-user to one volume private message. In some embodiments, the Memorybook entry may be in "real-time" wherein no artificial delay is built in to the delivery of the entry.

"User" as used herein includes a person who operates a Network Access Device to access a Memorybook. Examples of Users may include one or more of: students, parents, teachers, organization coordinators and third party service providers such as printers, imagers, web service administrators.

"User interface" or "Web interface" as used herein refers to a set of graphical controls through which a user communicates with a Memorybook. The user interface includes graphical controls such as button, toolbars, windows, icons, and pop-up menus, which the user can select using a mouse or keyboard to initiate required functions on the Memorybook interface.

"Wireless" as used herein refers to a communication protocol and hardware capable of digital communication without hardwire connections. Examples of Wireless include: Wireless Application Protocol ("WAP") mobile or fixed devices, Bluetooth, 802.11b, or other types of wireless mobile devices.

Referring now to FIG. 1A, a block diagram illustrates an exemplary user Network Access Device 103 with a Memorybook User Interface 100 displayed thereon. According to the pre invention the user interface 100 includes functionalities that enable dynamic input based upon a condition of an environment of a device used to generate or display the Memorybook interface. Typically, a Memorybook user interface displays image data 104, such as images of students, in a Memorybook as seen by most or all users including students, parents, teachers and administrators. The users may be associated with a same learning institution, same sports team or same organization activity group. Alternatively, the image data 104 may be related to faculty of an organization or university, employees of a same company, members of a group, members of a family or other definable group of people.

The user interface 100 includes image data 104 associated with Spatial Coordinate positions 101-102. A user may designate a Spatial Coordinate 101' 102' and operate a User interactive control to provide a media entry associated with the Spatial Coordinate 101' 102'. Typically, the User media entry will be associated with an image correlating with the Spatial Designation, such as for example an image of a photograph of a student. A user interactive area 106 may receive input from a user and provide one or both of human readable content or human recognizable images.

In some preferred embodiments, a system of Spatial Coordinates 101-102 will not be ascertainable to a user. The user will make a selection of a Spatial Coordinate via a cursor control or touch screen input. For example, a user 112 may input a cursor click on area of a static image that includes a likeness of a student. The area associated with the first user 112 that receives the cursor click will be associated with one or more Spatial Coordinates 101' 102'. As illustrated, the Spatial Designations may be determined via a Cartesian Coordinate. Other embodiments may include a Polar Coordinate.

According to the present invention, a user defined dynamic image entry 107 may be generated and associated with spatial coordinates of a digital communication and/or a Static Entry. The dynamic image entry 107 is preferably based upon an environmental condition associated with a device that generates the dynamic image entry and/or a device used to display the dynamic image entry. Environmental conditions may include one or more or a temperature in a location from which the dynamic image entry 107 is initiated or otherwise generated; an acceleration of a device from which the dynamic image entry 107 is initiated or otherwise generated; a speed at which of a device from which the dynamic image entry 107 is initiated or otherwise generated; a location of a device from which the dynamic image entry 107 is initiated or otherwise generated; motion of a device from which the dynamic image entry 107 is initiated or otherwise generated; time of day at a location of a device with which the dynamic image entry 107 is initiated or otherwise generated; weather of a location of a device with which the dynamic image entry 107 is initiated or otherwise generated; a time of year when the dynamic image entry 107 is initiated or otherwise generated or reviewed; an altitude of a device with which the dynamic image entry 107 is initiated or otherwise generated, a vibration of a device with which the dynamic image entry 107 is initiated or otherwise generated; a sound level of an ambient environment of a device used to generate the dynamic image entry; an acceleration of a device with which the dynamic image entry 107 is initiated or otherwise generated; and user interaction with the device.

For example, a dynamic image entry 107 may be generated from a mobile phone being operated by a user who is travelling on a motorcycle at increasing speed and during a rainstorm. A sensor in the mobile phone will register the vibration and the vibration pattern of the phone may be associated with a particular type vehicle (such as a certain model motorcycle). In addition a global positioning system (GPS) device within the mobile phone may note the location of the phone and the phone may contact a weather service which provides data indicating a rainstorm in that location. In addition, a calendar function within the phone may indicate that the date is July 4th. As a result a user generating a dynamic image entry may include an animated image, such as an emoticon that includes a motorcycle in the raining and accelerating with a United States flag for the July 4th holiday. The dynamic image entry may be placed on a static image of a first user 112. In addition, a song or video with some relevance, such as the song: You May Be Right by Billy Joel may play, or a sound of an engine revving.

Environmental conditions associated with a device that displays a dynamic image entry 107, may include one or more of: a temperature in a location from which the dynamic image entry 107 is displayed or otherwise reviewed; an acceleration of a device from which the dynamic image entry 107 is displayed or otherwise reviewed; a speed at which of a device from which the dynamic image entry 107 is displayed or otherwise reviewed; a location of a device from which the dynamic image entry 107 is displayed or otherwise reviewed; motion of a device from which the dynamic image entry 107 is displayed or otherwise reviewed; time of day at a location of a device with which the dynamic image entry 107 is displayed or otherwise reviewed; weather of a location of a device with which the dynamic image entry 107 is displayed or otherwise reviewed; a time of year when the dynamic image entry 107 is displayed or otherwise reviewed or reviewed; an altitude of a device with which the dynamic image entry 107 is displayed or otherwise reviewed, a vibration of a device with which the dynamic image entry 107 is displayed or otherwise reviewed; a sound level of an ambient environment of a device used to display or otherwise review the dynamic image entry; and acceleration of a device with which the dynamic image entry 107 is displayed or otherwise reviewed.

In still another aspect of the present invention, a user may activate an environmental data user interactive device 109, such as a switch or GUI, to display the actual data 109A associated with a dynamic image entry 107. In this manner, a first user 113 may generate a dynamic image entry 107 with a first device and have a first set of data associated with the first device at the time of generation of the dynamic image entry 107 and a second user 114 may access the data recorded and/or associated with the first user 112 and the first user device.

In some embodiments, a second device used to display or otherwise review the dynamic image entry 107 may generate additional data descriptive of an environments of the second user device and the second user may additionally access the data descriptive of an environments of the second user device. The dynamic image entry 107 may be animated based upon reference to one or both of the data descriptive of the environment of the first user device and the second user device.

In various embodiments of the present disclosure, interactive areas may include, by way of a non-limiting example, one or more of: a) a user interactive area 106 that allows a user to search an index for Spatial Coordinates that correspond with subject matter, such as images or text descriptive of a particular person or subject; b) a user interactive area 108 that allows a user to provide a Memorybook Entry according to Spatial Coordinates and page selected; c) a user interactive area 110 that allows a user to scroll 105 to view content, such as images of students in the memory book. The user interface 100 may be provided by a software application installed on a network access device 103, such as a mobile device. Alternatively, the user interface 100 may correspond to a webpage obtained from a website. The software application or the website may interact with a Memorybook web service hosted on a computerized network server to provide the user interface 100 on the network access device 103.

A user, such as a first student, viewing the user interface 100 on a Network Access Device 103 may select an area associated with the first user 112 of a User Interface 100 that is associated with a subject a Memorybook Entry. In some embodiments, the Memorybook Entry may be for the benefit of a second user, such as a second student. The area selected by the first user 112 may, for example, include an image of themselves, or another subject. An area may be selected according to Spatial Coordinates. The Spatial Coordinates designate a particular location on a User Interface. According to the present disclosure, portions of a static image of a Memorybook page, such as a pdf image may be associated with a particular subject. For example, Spatial Coordinates X' and Y' may be associated with an image the first student on a particular page.

Alternatively, a user may tap on Spatial Coordinates that correspond with a chosen subject, such as an image of a student, which may represent a second user 114, or use the user interactive area 106, which may comprise a search tool, and an associated index that matches Spatial Coordinates and page numbers with subject matter. After a particular Spatial Coordinate has been indicated, a user may make a Memorybook Entry into a Memorybook associated with a particular user. In some embodiments, a first user may enter a Memorybook Entry into multiple Memorybook volumes associated with multiple Memorybook owners in a single-entry action by designating multiple destination Memorybooks.

Figure 1B:
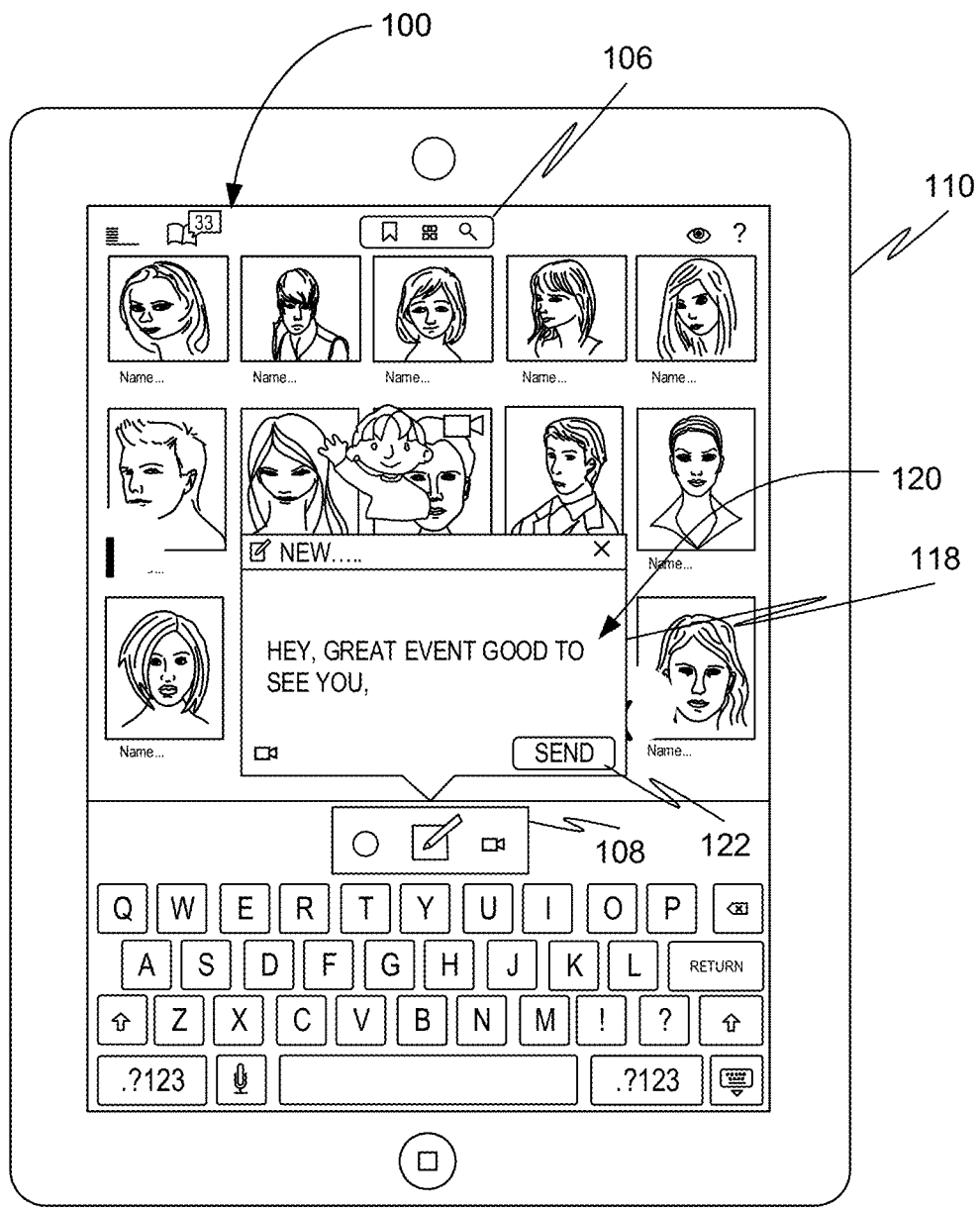
FIG. 1B illustrates block diagrams of exemplary user interfaces including functionalities that may be used to implement some embodiments of the present disclosure.

Referring now to FIG. 1B, some embodiments, the user interface 100 displays a text box 118. A first user may select a type of Memorybook Entry. Memorybook entries may include, for example, one or more of: a text message, an emoticon, free-style drawing, a video and an audio message. A user may select a type of Memorybook Entry an initiate its entry via an appropriate option from the user interactive area 108. Alternatively, when a user taps Spatial Coordinates associated with an image of a second user 114, or uses a user interactive area 106, which may comprise a search tool, the user interface 100 may show a drop-down menu from which the first user 112 may select the type of a Memorybook Entry.

Further, in some embodiments, a speech-to-text converter may be used to convert an audio Memorybook Entry into text. Yet further, in some embodiments, the first user 112 may designate Spatial Coordinates associated with an image of the second user 114 and link a captured image (selfie) or initiate a video recording of the first user 112 speaking to the second user 114. The captured image or the recorded video is then uploaded on the Memorybook Web Server. A recorded image may be a "selfie" message recorded and uploaded. The first user 112 may also select a location for a Memorybook Entry on the user interface 100. Further, in some embodiments, the first user 112 may send the same message to multiple students by selecting multiple students the user interface 100. Yet further, in some embodiments, the first user 112 may select an interest group or a family group and to send a same message to members selected as a group.

In some exemplary embodiments, the first user 112 selects an option from the user interactive area 108 to provide a Memorybook Entry. Accordingly, the user interface 100 displays, referring to FIG. 1B the text box 118. Then, the first user 112 types a text 120 in the text box 118. The text 120 may read, for example: "Hey Bridget . . . great to see you! Finally, the first user 112 clicks on a "send" button 122 to submit the text 120. Further, when the text 120 is submitted, the mobile device of the first user 112 may determine the location of the first user 112 and send the location information along with the text 120 to the Memorybook Web Server. Further, in some embodiments, the location of the first user 112 may be displayed along with a Memorybook Entry on the user interface 100. In addition, a date and time stamp may be displayed along with a Memorybook Entry.

In some embodiments, each Memorybook Entry received by the Memorybook Web Server is associated with a universally unique identifier (UUID). The UUID may be referenced to track and manage Memorybook Entries.

In some additional embodiments, a Memorybook may include a dynamic book length feature wherein a user may add additional pages to a Memory Book. The additional pages may include images, text and/or video content. The additional pages may be designed and decorate to commemorate time spent by users together. Similarly, an interactive feature in a user interface may allow a User to click on an image and start a video associated with the image. In some embodiment the additional data includes environment based dynamic emotional or other dynamic imagery.

Figure 1C:
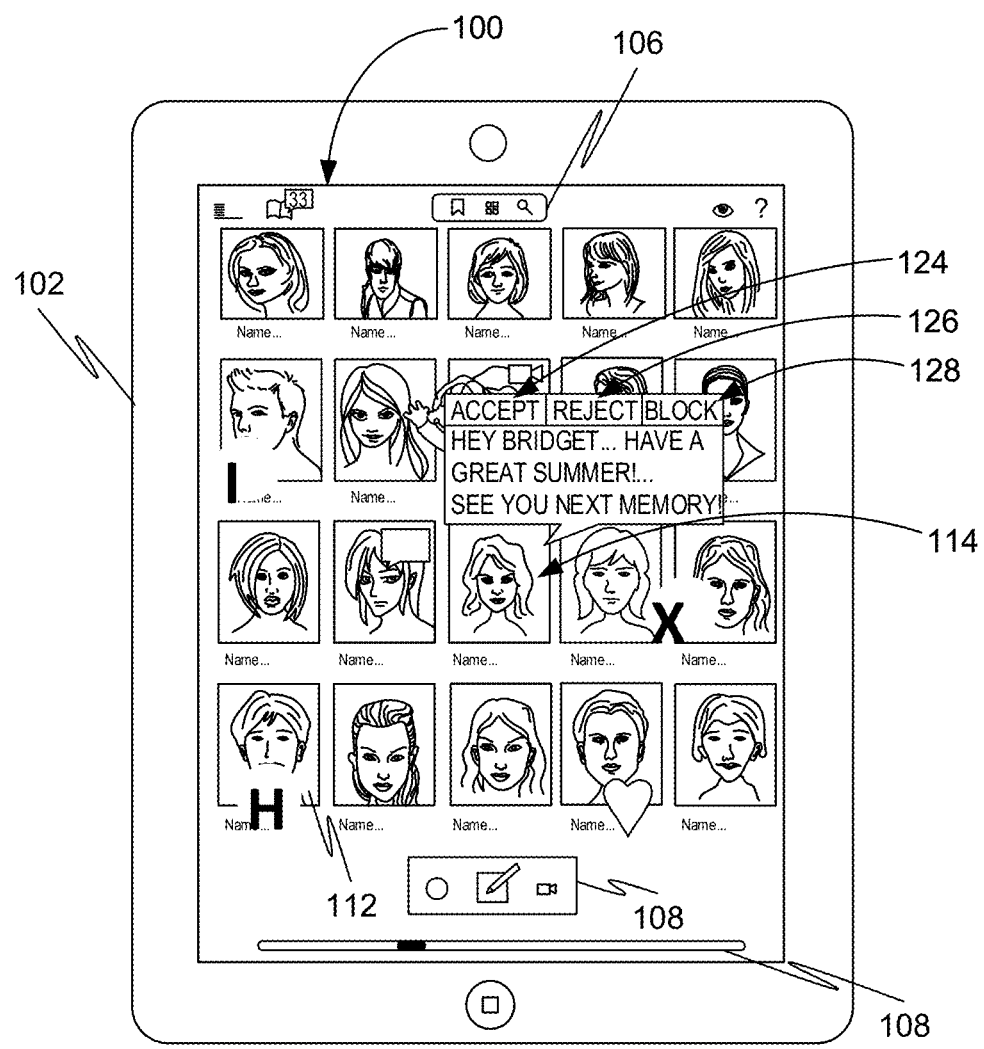
FIG. 1C illustrates block diagrams of exemplary user interfaces including functionalities that may be used to implement some embodiments of the present disclosure.

Referring now to FIG. 1C a user interface 100 is illustrated that may be displayed on a mobile network access device of the second user 114. The Memorybook Web Server may transmit a notification to the second user 114, wherein the notification includes information about a Memorybook Entry received from the first user 112. As shown, in some embodiments, the user interface 100 conveys the displays the Memorybook Entry, such as a text 120 message submitted by the first user 112 for the second user 114. The user interface 100 allows the second user 114 to accept or reject the Memorybook Entry with text 120 by using an interactive control, such as one of an "accept" button 124 and a "reject" button 126.

If the second user 114 rejects the Memorybook Entry with text 120, it does not become associated with the Memorybook, or other media volume associated with the second user 114. Some embodiments may also include a "block" function 128, which may be used to completely block the first user 112 from sending more Memorybook Entries. For example a second user 114 may use the "block" button 128 if the text 120 is inappropriate; when the second user 114 does not know the first user 112; or if the second user 114 simply does not wish to receive Memorybook Entries from the first user 112. A student may also be able to "white list" messages and or provide a Memorybook Entries by activating functionality to: "Accept messages from a source", such as, for example, a user identified as Student 123.

Figure 1D:
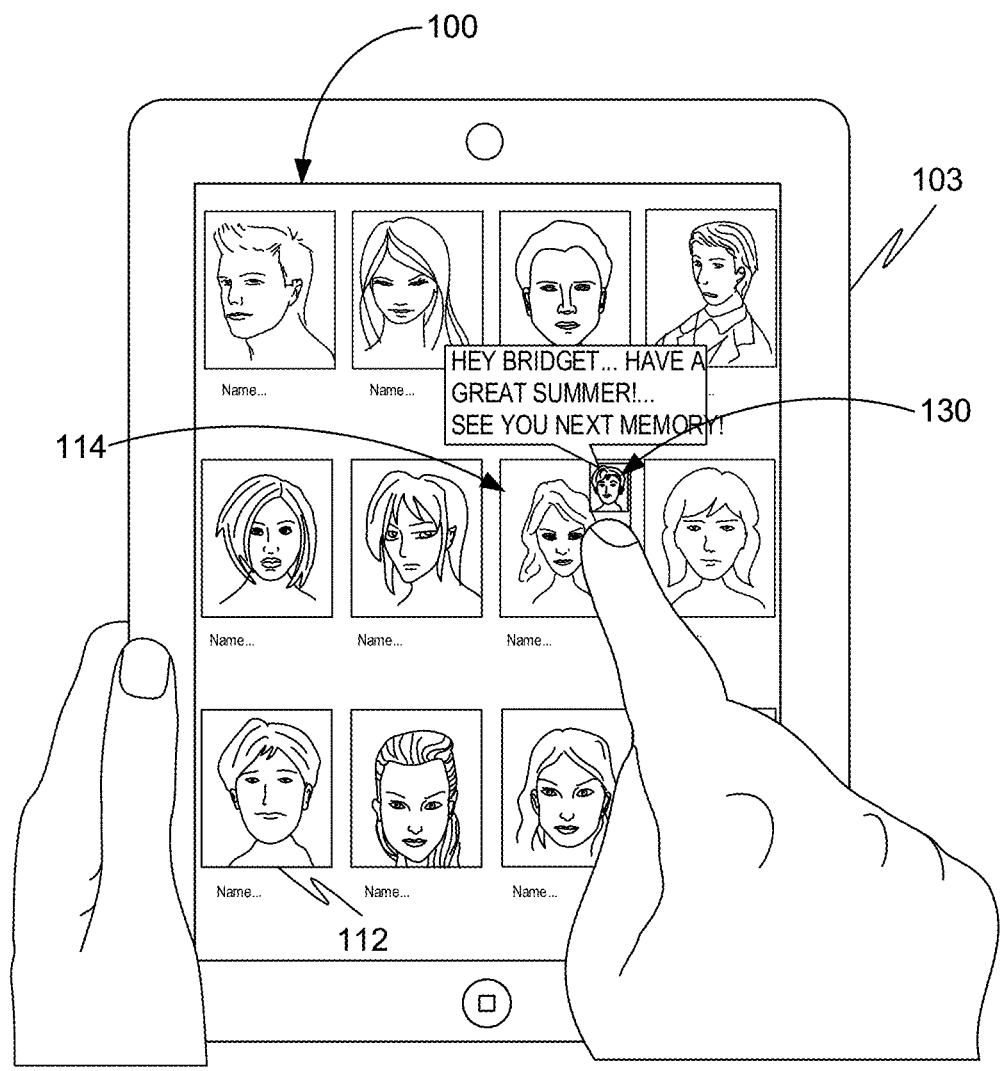
FIG. 1D illustrates block diagrams of exemplary user interfaces including functionalities that may be used to implement some embodiments of the present disclosure.

Referring now to FIG. 1D an illustration of the user interface 100 viewed by the second user 114. The user interface 100 showing the accepted Memorybook Entry in places as seen by the second user 114. Next to the second user's 114 large image, there is a small icon 130 with the image of the first user 112. The user interface 100 places the accepted provide a Memorybook Entries on a digital provide a Memorybook Entry layer on top of the students' images, allowing the second user 114 to turn-on and turn-off a Memorybook Entry layer to make it visible and invisible respectively.

In some aspects, multiple users may send private one-to-one messages to other students, and respective users may accept or reject Memorybook Entries individually; therefore, each user may view and own a different digital copy of their Memorybook. For example, the first user 112 may provide a Memorybook Entry on multiple students. Some of the students may accept a Memorybook Entry and some may reject. Accordingly, each user may view a different version of the same memory book.

Web Interface

Figure 2:
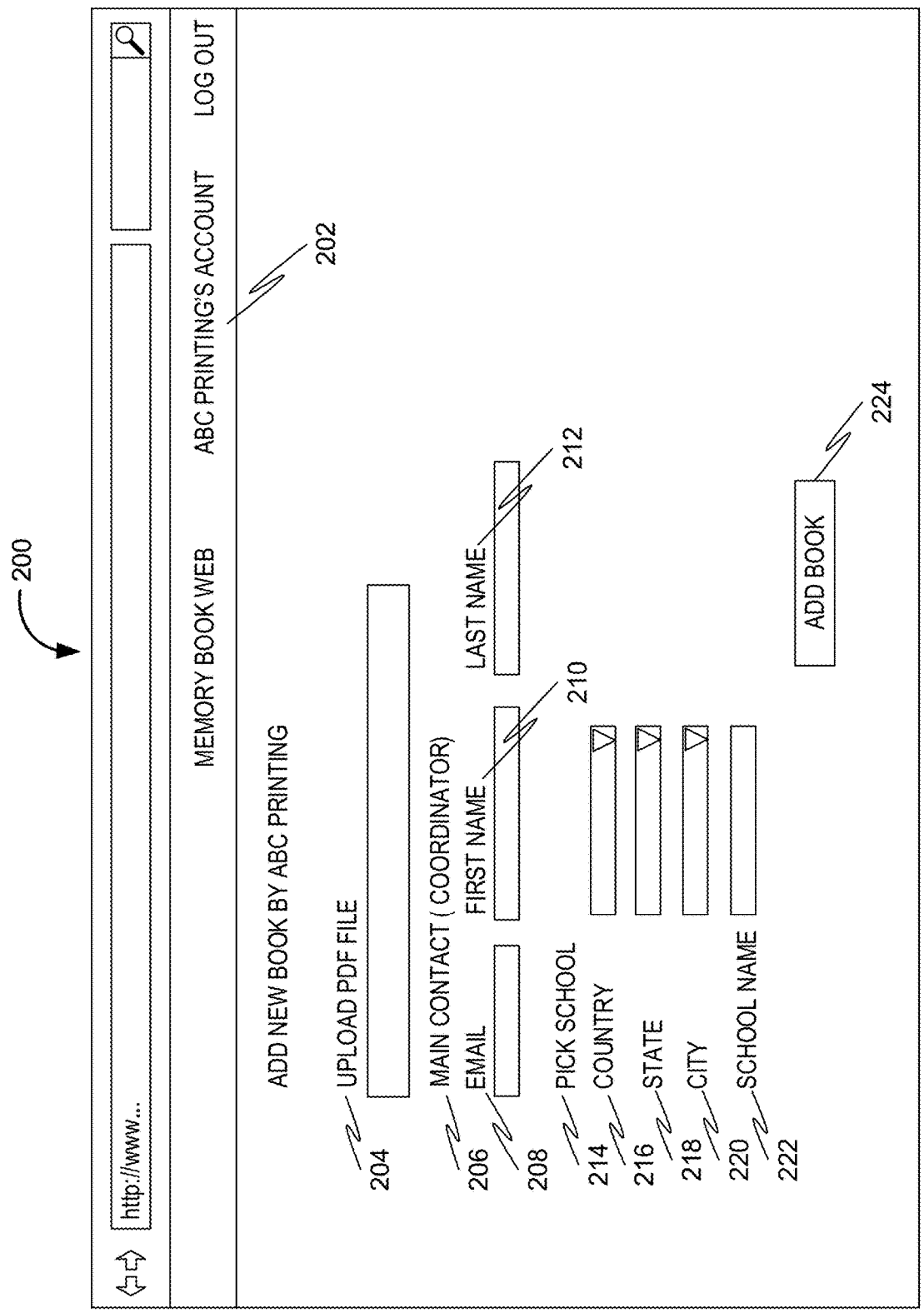
FIG. 2 illustrates a web interface viewed by an administrator, the web interface including functionalities that may be used to implement some embodiments of the present disclosure.

Referring now to FIG. 2 an illustration of a web interface 200 according to some aspects of some embodiments of the present disclosure. The web interface 200 includes functionalities that may be used to implement some embodiments of the present disclosure. The web interface 200 may include a representation of a static image correlating with a Memorybook page and Spatial Coordinates corresponding with areas of each static image. The third-party service provider may be a printing company (such as ABC printing 202) that specializes in preparing memory books or an Internet company providing the Memorybook Web Server to learning institutions to upload and view their memory books.

In some embodiments, the web interface 200 includes a web form that allows an administrator to add a new Memorybook to the Memorybook Web Server. The administrator may upload a new Memorybook book using an "Upload PDF file" form field 204. Further, the new book may be uploaded in one of PDF, DOC, DOCX, PPT and PPTX formats. Next, the administrator may add a main contact for the Memorybook using a "Main Contact" form field 206. The "Main Contact" form field 206 allows the administrator to provide an email address 208, a first name 210 and a last name 212 of the main contact. A "Pick" form field 214 allows the administrator to include organization information such as a country 216, a state 218, a city 220 and an organization name 222.

Further, the "Pick Organization" form field 214 may allow the administrator to fill in a year, a group and a title of the Memorybook (not shown). In addition, the administrator may use an "Add book" button 224 to submit the static memory book images to the Memorybook Web Server. Once the static memory book entries are uploaded with most or all the required information, the Memorybook Web Server generates a unique master book ID per upload. The book ID may be generated in the format: "organization name year group/title name". The Memorybook Web Server provides a confirmation when the book is uploaded successfully.

The Memorybook Web Server may provide access to memory books to users including, for example: students, faculty and parents in exchange for a payment. Further, advertisements may be added to the web interfaces (including the web interface 200) provided by the Memorybook Web Server. Some examples of the advertisements include banner advertisements, pop-up advertisements, and the like. The administrator may provide hyperlinks to specific advertisements, such as, by way of non-limiting example, for framed or poster board versions of Memorybook images and Memorybook Entries, for products that may interest the users, for a fundraiser for the organization or other purpose. Alternatively, the administrator may provide advertisements using a third-party Internet advertising network including for instance Google Adwords®, Facebook Ads®, or Bing® Ads. The third-party internet advertising networks may provide contextual advertisements.

Further, web interfaces may allow an administrator to manage accounts, create user accounts, reset passwords, delete books and add books on the Memorybook Web Server. Moreover, the web interfaces may provide one or more features to the administrators including defining administrator rights, selecting administrator users, re-uploading book PDF, updating book information, inviting users, un-inviting users, sending incremental invites, displaying user statistics, inserting new pages to the Memorybook Web Server, tracking revenue details and managing advertisements.

Figure 3:
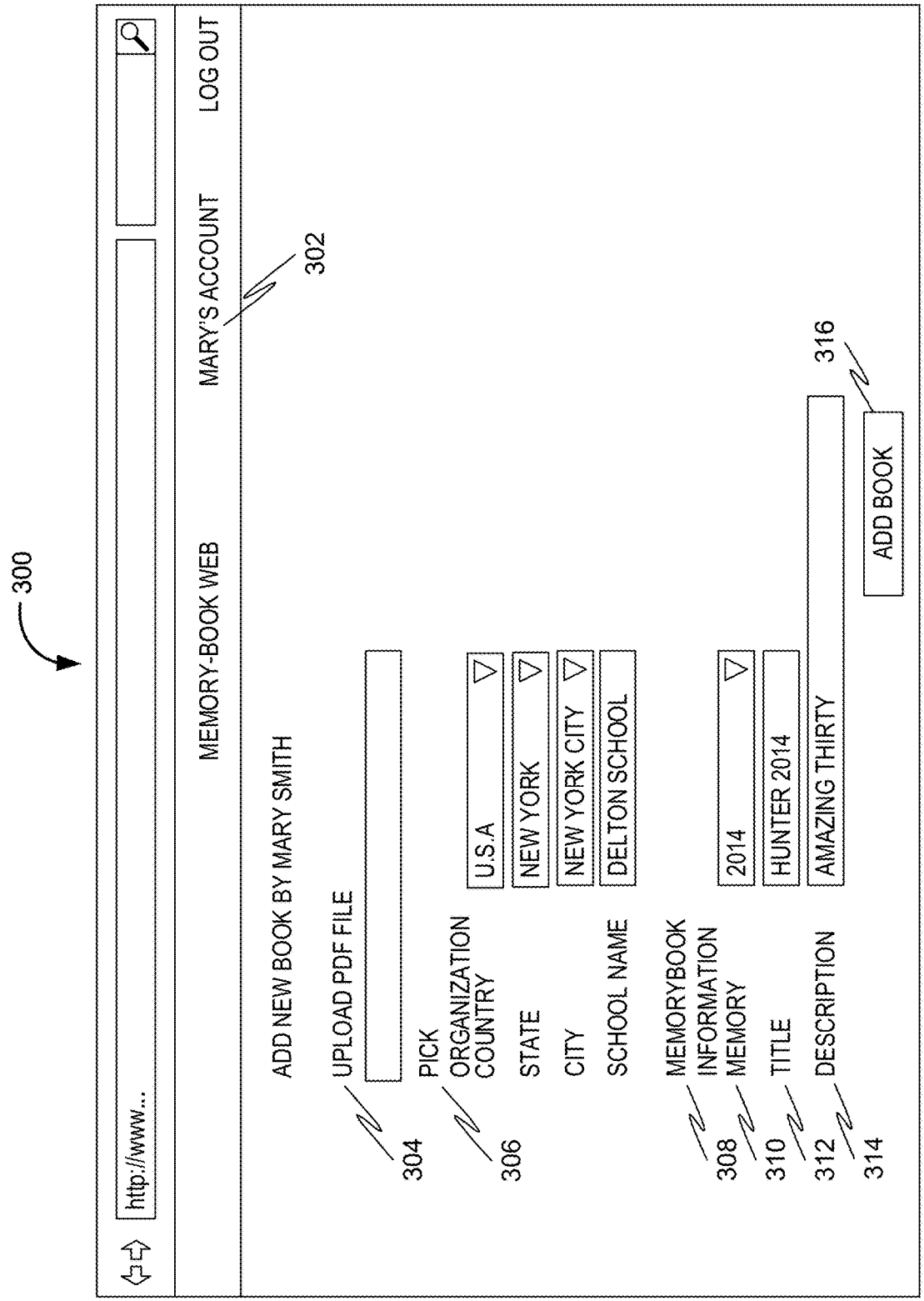
FIG. 3 illustrates a web interface viewed by a main contact, the web interface includes functionalities that may be used to implement some embodiments of the present disclosure.

Referring now to FIG. 3 a web interface 300 is illustrated, that may be viewed by a main contact (i.e. Mary 302). The web interface 300 includes functionalities that may be used to implement some embodiments of the present disclosure. The web interface 300 may, for example, include a web form that allows Mary 302 to add a new memory book to the Memorybook Web Server. The web interface 300 is similar to the web interface 200 explained in detail in conjunction with FIG. 2 above.

Functionality may include, for example, uploading static images of a media volume, such as a Memorybook. An "upload PDF file" form field 304 allows for uploading one or more static images associated with a Memorybook or other volume. In addition, a library of dynamic images that may be included in a memory and dynamic based upon an environment of a device accessing the Memorybook may be uploaded or designated on the server. A "Pick Organization" form field 306 associates the uploaded static images with a particular organization. Other embodiments may include static images of a volume associated with a group of people, such as a family, a company, a department, or other definable group. The web interface 300 may further include "memory book information" form fields 308 year 310, a title 312 and a description 314. Once the required information is provided, a user such as Mary 302 may use an "Add Book" button 316 to submit the memory book to the Memorybook Web Server.

Additional functionality may include printing Memorybook entries on a transparent medium, such as a velum or acetate page and arranging for the transparency to be inserted over a physical Memory Book. The spatial coordinates of the Memorybook entries will align with the designated location for a Memorybook entry.

Figure 4A:
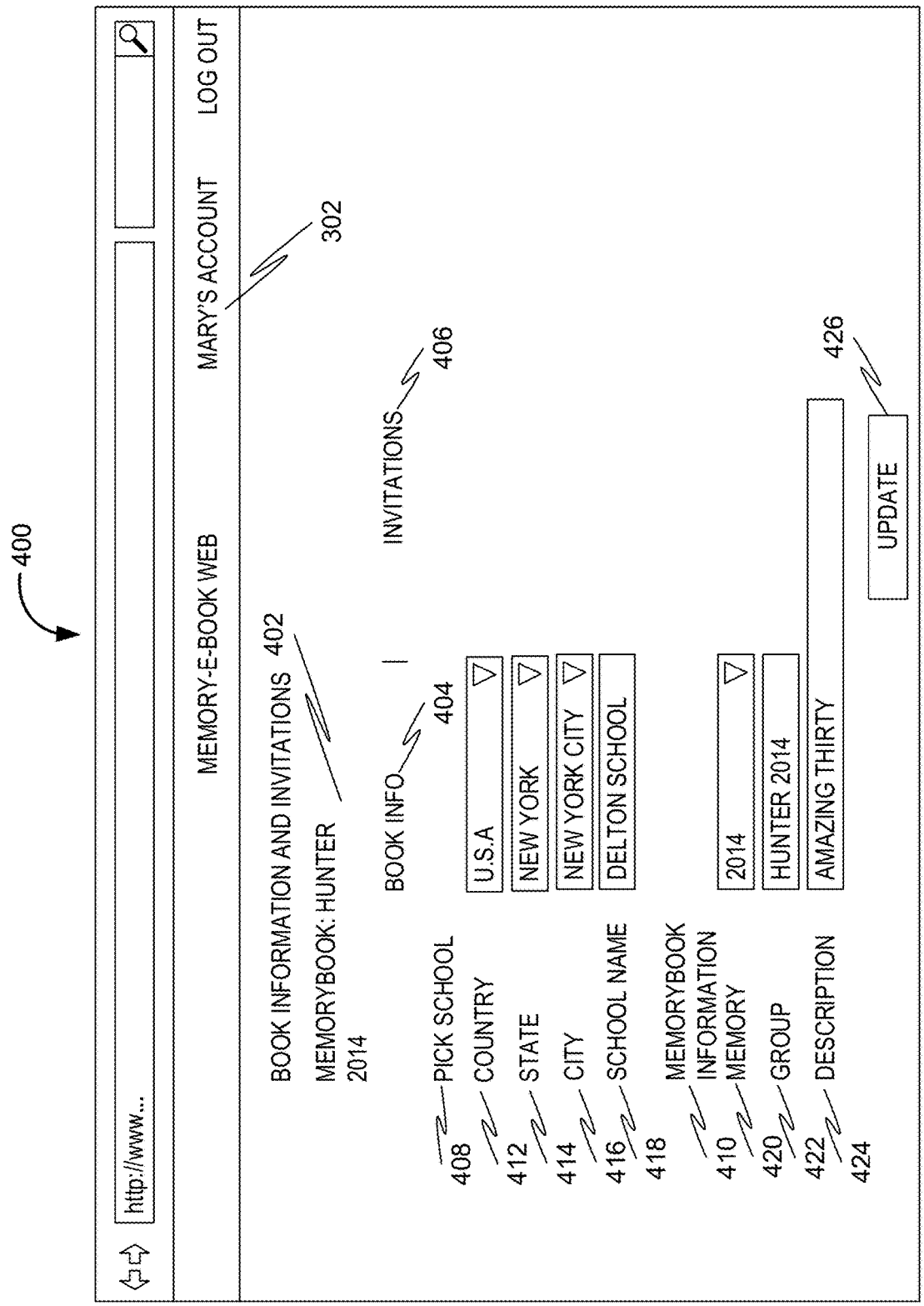
FIG. 4A illustrates a web interface viewed by the main contact, the web interface includes functionalities that may be used to implement some embodiments of the present disclosure.

Referring now to FIG. 4A an illustration of a web interface 400 viewed by a user Mary 302, the web interface 400 includes functionalities that may be used to implement some embodiments of the present disclosure. In some embodiments, web interface 400 may include a web form that allows Mary 302 to update a memory book. The web interface 400 shows that a title 402 of the memory book is "Hunter 2014". Further, the web interface 400 may show two or more tabs such as: a "book info" tab 404 and an "invitations" tab 406. When the "book info" tab 404 is selected, the web interface 400 shows the fields "pick organization" 408 and "memory book information" 410. The "pick organization" field further includes one or more fields including a country 412, a state 414, a city 416, and an organization 418. In the example shown, the country 412 is "U.S.A", the state 414 is "New York", the city 416 is "New York City", and the organization 418 is "Delton Organization". The "memory book information" field 410 further includes one or more fields including a year 420, a group 422 and a description 424. In the example shown, the year 420 is "2014", the group 422 is "Hunter 2014" and the description 424 is "Amazing thirty". Once the required information is provided, the main contact uses an "update" button 426 to update the memory book.

Referring now to FIG. 4B an illustration of a web interface 428 viewed by user Mary 302, when the "invitations" tab 406 is selected by Mary 302. Mary 302 may send invitations to users (including students and parents) using the web interface 428. Mary 302 enters an invitation message in a "personalized invitation message" field 430. If a personalized invitation message is not provided, then a default message is used. Further, a "grade/class" field 432 is used to indicate the appropriate grade or class. Yet further, the web interface 428 shows a list of rows 434, 436, 438, 440 and 442. Each row 434, 436, 438, 440 and 442 allows Mary 302 to provide details for a user including email, first name and last name of the user. Mary 302 may manually fill in the rows 434, 436, 438, 440 and 442. Further, more rows may be added using an "add more rows" feature 444. Alternatively, Mary 302 may upload a Microsoft EXCEL® document containing the details a user using an "upload excel" feature 446. The Memorybook Web Server automatically parses the uploaded Microsoft EXCEL® document to obtain names and email addresses of users. Finally, Mary 302 sends out the invitations using a "send invitations" button 448. Thereafter, the Memorybook Web Server generates a unique book view ID for each student. The book view ID may be prepared in format such as "book ID Email member's name_member". This book view ID is included in the invitation message sent to most or all users. Further, the invitation message may include a hyperlink to the memory book, which when activated directs the user to the relevant memory book on the Memorybook Web Server. For each invitation, the Memorybook Web Server may receive an acknowledgement indicating a successful or a failed delivery.

Application User Interface

Figure 5A:
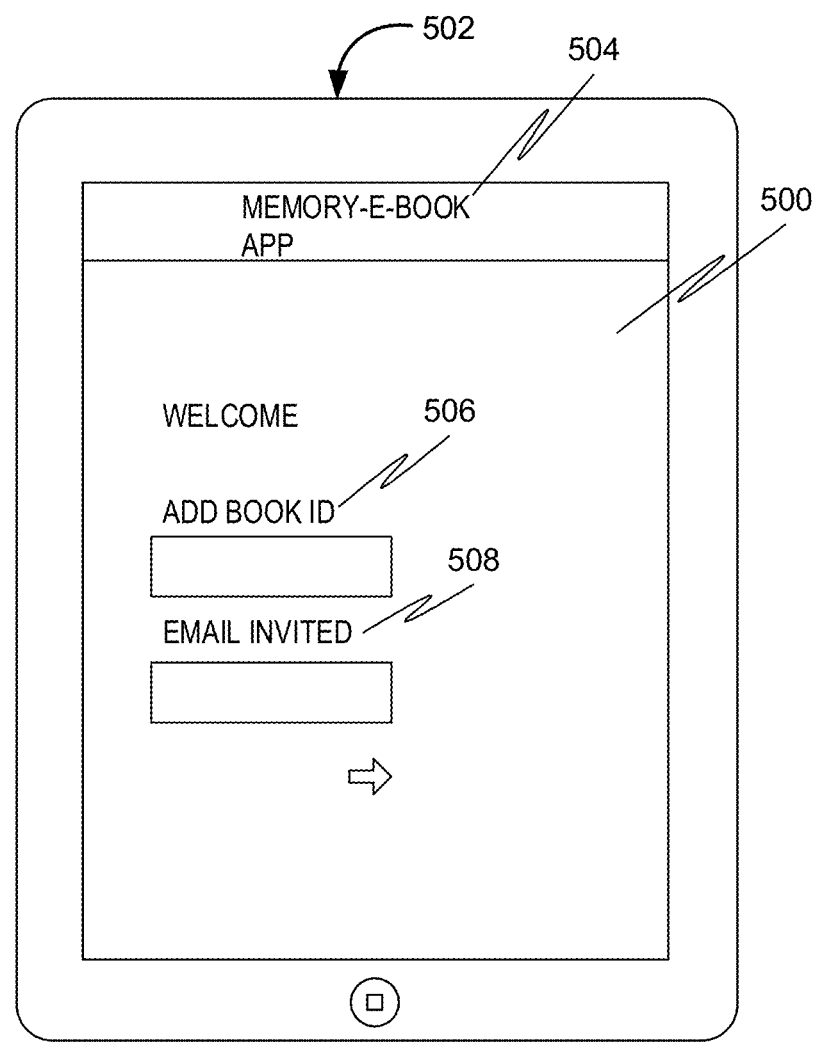
FIG. 5A illustrates an application user interface viewed by a user, the application user interface includes functionalities that may be used to implement some embodiments of the present disclosure.

Referring now to FIG. 5A an illustration of an application user interface 500 viewed by a user (a student or a parent) on a mobile device 502, the application user interface 500 includes functionalities that may be used to implement some embodiments of the present invention. The application user interface 500 may be displayed when the user receives the invitation message from Mary 302 and follows the hyperlink provided in the invitation message to access the relevant memory book. The application user interface 500 may be provided by a "Memorybook" application 504 installed on the mobile device 502. However, if the "Memorybook" application 504 is not already installed on user's mobile device 502, then the user may be prompted to install the "Memorybook" application 504. For example, the mobile device may be an Android™; iOS™ or other operating system based device. In some embodiments, a user may access an application providing website such as Apple, Google Play, Amazon or other App store to install a "Memorybook" application 504.

Figure 5B:
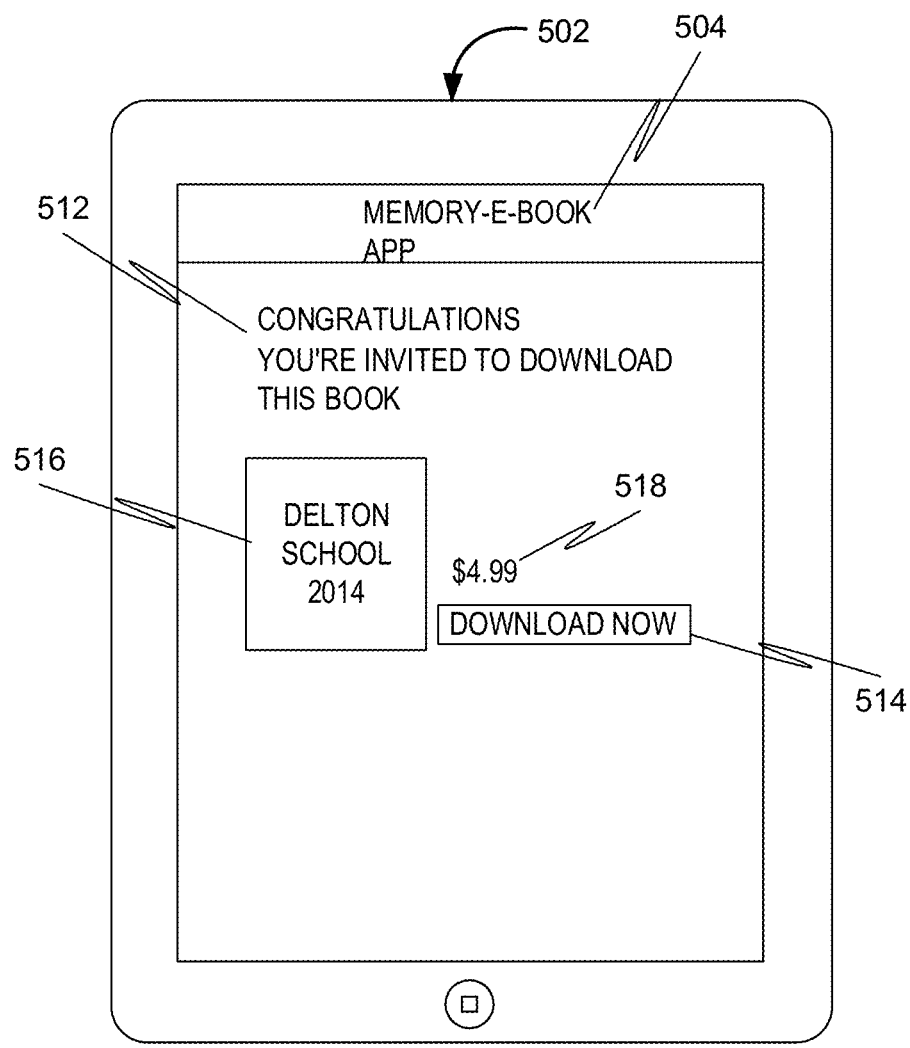
FIG. 5B illustrates an application user interface viewed by a user, the application user interface includes functionalities that may be used to implement some embodiments of the present disclosure.

The application user interface 500 is a web form including an "add book ID" field 506 and an "email invited" field 508. The user enters the book view ID obtained from the invitation email into the "add book ID" field 506 and the email ID in the "email invited" field 508. If the book view ID and the email ID are correct, the "Memorybook" application 504 displays an application user interface 512 on the mobile device 502 as shown in FIG. 5B. The application user interface 512 provides a "download" button 514 that allows the user to download "Delton Organization 2014" memory book 516 shared by Mary 302 via the invitation message. The "Delton Organization 2014" memory book 516 may be provided at a price. As shown, the application user interface 512 displays a price 518 of the "Delton Organization 2014" memory book 516 to be $4.99. Accordingly, the "Memorybook" application 504 also provides a payment workflow that allows the users to pay the required amount. Further, the revenue generated by selling the memory books may be shared among one or more of an Internet company providing the Memorybook Web Server, a local printer and an organization. Accordingly, the Memorybook Web Server tracks revenue sharing details. In an alternate embodiment, the user accesses the hyperlink in the invitation message and the relevant memory book is automatically downloaded and added to the "Memorybook" application 504 installed on the user's mobile device 502. Further, the "Memorybook" application 504 provides a feature for batch migrating memory books to another mobile device.

Figure 6:
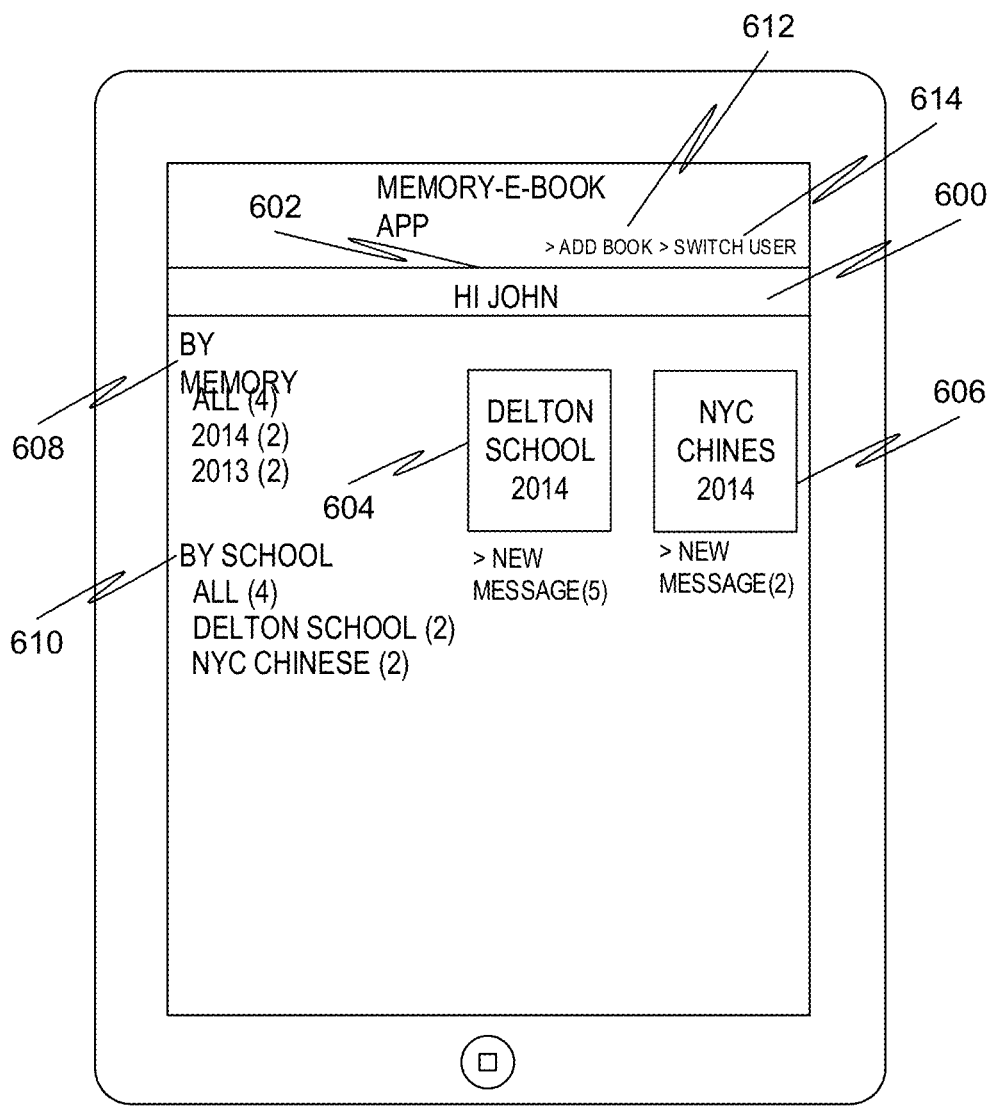
FIG. 6 illustrates an application user interface viewed by a user, the application user interface includes functionalities that may be used to implement some embodiments of the present disclosure.

Referring now to FIG. 6, an application user interface 600 that may be presented to a user (i.e. John 602) is illustrated. In some embodiments, the application user interface 600 includes functionalities that may be used to implement various aspects of the present disclosure. Some embodiments may include all application user interface 600 that presents memory books that John 602 has access to; for example, a "Delta Organization 2014" memory book 604 and a "NYC Chinese 2014" memory book 606. Further, John 602 may access memory books by selecting an appropriate year from a list 608 or by selecting an appropriate organization from a list 610. Further, John 602 can add more memory books using an "add book" button 612. When the "add book" button 612 is activated, John 602 is shown the application user interface 500.

In another aspect, the mobile device may be shared among multiple users. Accordingly, a "Switch User" button 614 may be used to switch the "Memorybook" application 504 among multiple users. Further, the "Memorybook" application 504 allows a user to send messages to another user across memory books. For example, a user in the "Delton Organization 2014" memory book 604 may send a message to another user in the "NYC Chinese 2014" memory book 606. Further, the "Memorybook" application 504 allows a user to send personal notes to another user, wherein the personal notes are not publicly accessible. Moreover, a user may invite relevant users from the "Memorybook" application 504. For example, a student may invite his parents or friends outside organization to access the memory book.

Figure 7A:
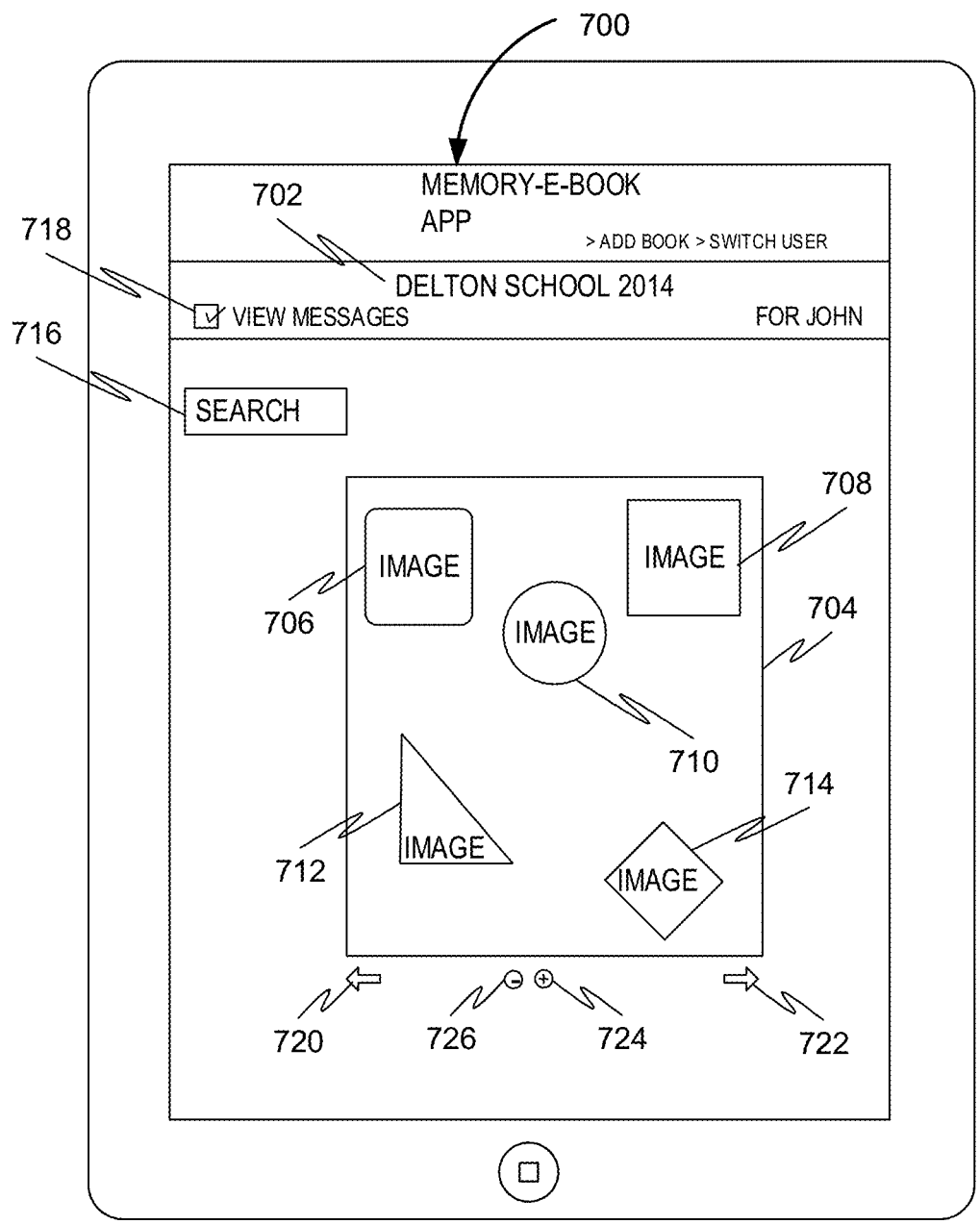
FIG. 7A illustrates an application user interface viewed by a user, the application user interface allows the user to annotate images according to some embodiments of the present disclosure.

Referring now to FIG. 7A an application user interface 700 is illustrated with an exemplary memory book presented as "Delton organization 2014" memory book 702 to John 602. The application user interface 700 includes a user interactive area 704 showing images 706, 708, 710, 712 and 714. The images 706, 708, 710 and 712 include images of people, places or things relevant to in the "Delton Organization 2014". John may also provide a dynamic image 714 that is animated based upon an environmental condition of John's device or another user viewing the Memorybook. John 602 may search students and messages using a "Search" button 716. Further, John 602 may view messages or hide messages using a "view images" radio button 718. The "view images" radio button 718 allows John 602 to turn-on or turn-off a Memorybook Entry layer. John 602 may turn pages to view other students using arrows 720 and 722. In addition, John 602 may zoom-in or zoom-out of the user interactive area 704 using the controls 724 and 726 respectively.

John 602 may input Memorybook Entries for students shown in user interactive area 704. Accordingly, John 602 may select Spatial Coordinates associated with an image, for example, the image 710 from the application user interface 700.

Figure 7B:
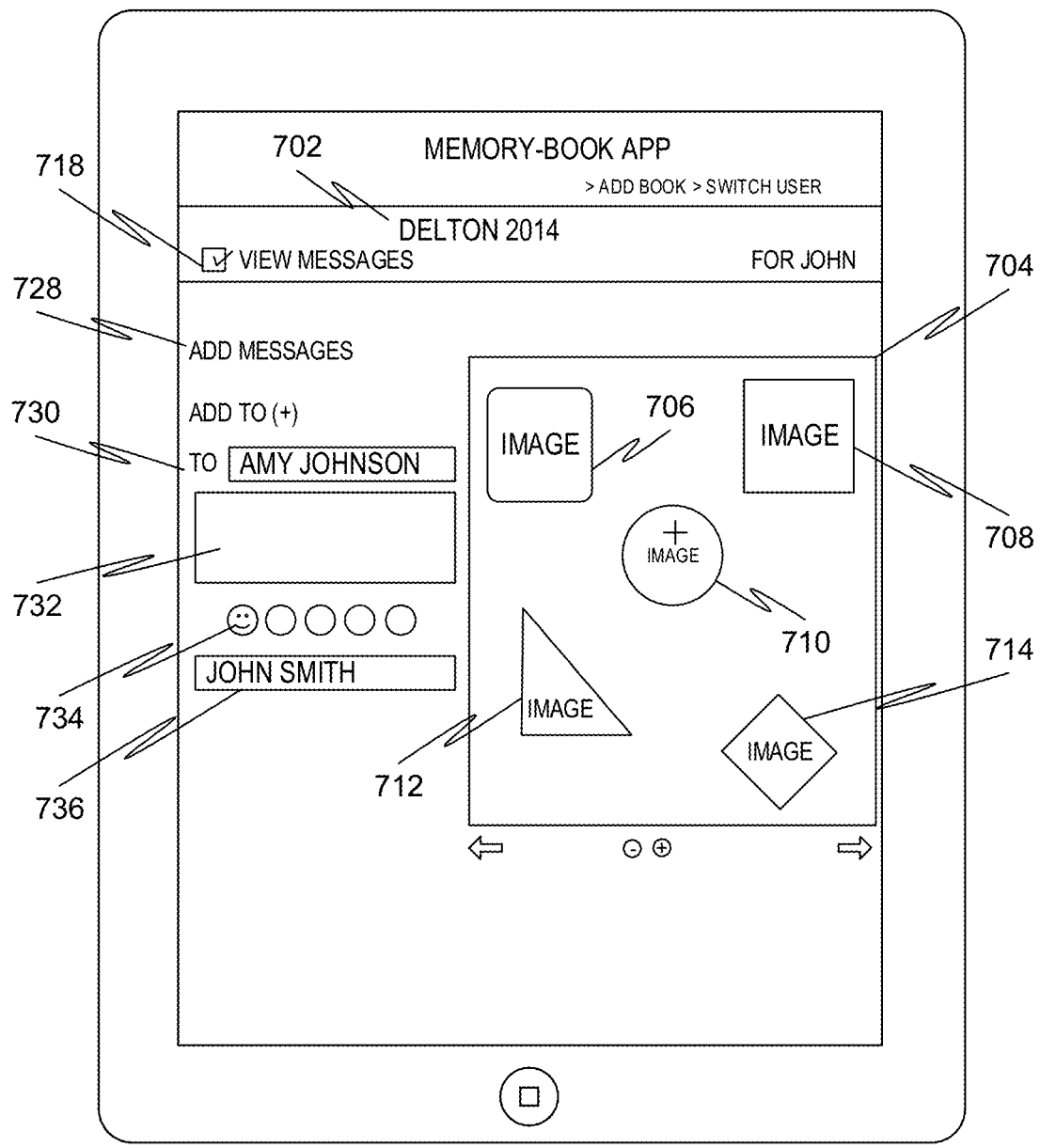
FIG. 7B illustrates an application user interface viewed by a user, the application user interface allows the user to annotate images according to some embodiments of the present disclosure.
Figure 7C:
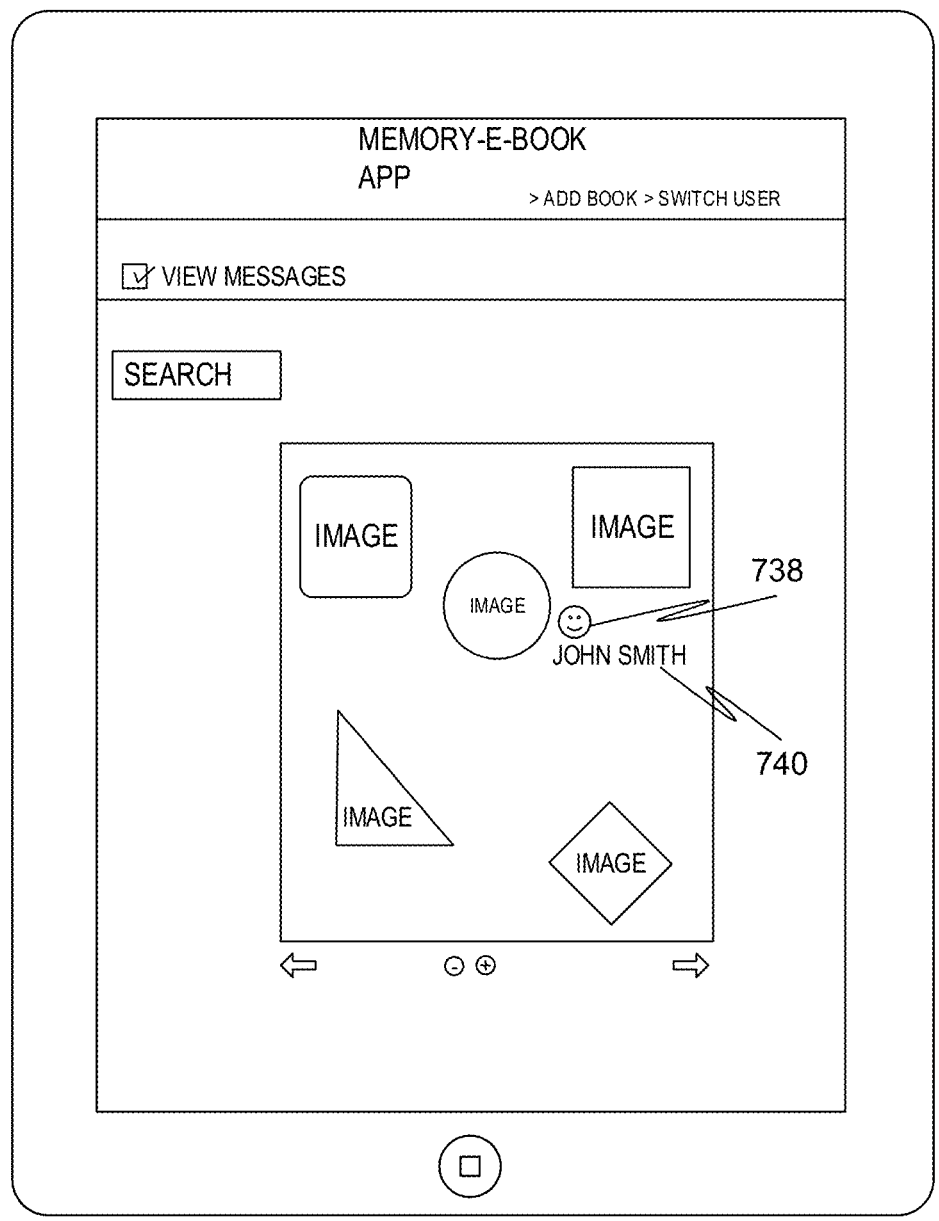
FIG. 7C illustrates an application user interface viewed by a user, the application user interface allows the user to annotate images according to some embodiments of the present disclosure.

Referring now to FIG. 7B, in response to selection of the image 710, the "Memorybook" application 504 shows an "add messages" field 728. The "add messages" field 728 further includes a "To" field 730 showing the name of the student ("Amy Johnson") in the selected image 710. In some embodiments, the user may add a Memorybook Entry in a text area field 732 and add an emoticon 734. The name of the user (i.e. "John Smith") providing a Memorybook Entry may be displayed in a field 736. John 602 may submit a Memorybook Entry 738 wherein an emoticon is placed next to the image 710 as shown in FIG. 7C. The name of a Memorybook Entry author ("John Smith") 740 may also displayed next to a Memorybook Entry 738.

In some embodiments, a user, such as John 602 may also provide an image of a Memorybook Entry including an image, a sticker or a signature, a video as a Memorybook Entry, an audio provides a Memorybook Entry, a free-style drawing and a data package comprising contact information. Further, the "Memorybook" application 504 offers in application merchandize such as stickers, emoticons, icons etc. The users may purchase the merchandize and use to provide a Memorybook Entry in a memory book. The second student ("Amy Johnson") receives notification about a Memorybook Entry 738. The "Memorybook" application 504 allows a second student to accept or reject a Memorybook Entry 738. Further, the second student may report spam or inappropriate message and block John 602 from posting provide a Memorybook Entries in future. The "Memorybook" application 504 also provides latest activity summary to the users.

Further, a Memory book server may define various types of users including printer representative, organization representative, parent, and student. For each user type, the Memorybook Web Server may define access rights to features of the Memorybook Web Server. In an exemplary embodiment, the Memorybook Web Server administrator may auto-generate emails and send them to users, and create accounts for various users.

A printer representative may be granted rights to upload static images, such as a PDF images. A parent user may be allowed to set read or write permission settings for their wards. A student user may be allowed to receive invitation email to access a memory book, self-identify with an image in the memory book, view the memory book, add messages to the memory book, receive message read notices, receive new message notices, receive weekly reminder of new messages or activities and report spam provide a Memorybook Entry. In some embodiments, an organization administrator may be provided with functionality to designate a Memorybook administrator user.

Mobile Device

Figure 8:
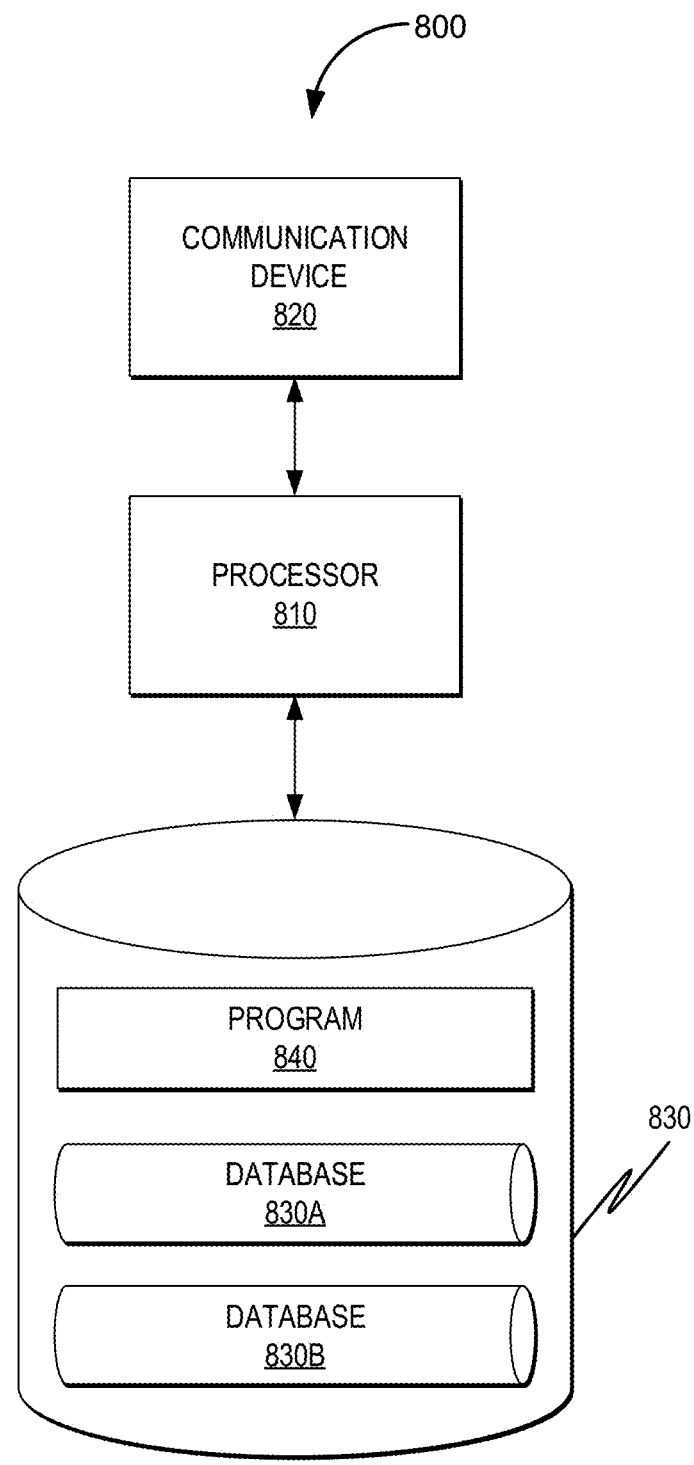
FIG. 8 illustrates a block diagram illustrating a controller that may be embodied in one or more of mobiles devices and utilized to implement some embodiments of the present disclosure.

Referring now to FIG. 8, an illustration is provided with a controller 800 that may be embodied in one or more of communications accessible devices and utilized to implement some embodiments of In some embodiments, Communications accessible devices may include, by way of example, a hand held device such as a cellular phone, a pad device, a personal computer, a server, a personal digital assistant, an electronic reader device or other programmable device.

The controller 800 comprises a processor 810, which may include one or more processors, coupled to a communication device 820 configured to communicate via a communication network, such as the Internet, or another cellular based network such as a 3G or 4G network (not shown in FIG. 8). The communication device 820 may be used to communicate with a digital communications network, such as, for example, the Internet available via the Internet Protocol, or a cellular network such as 3G or 4G.

The processor 810 is also in communication with a storage device 830. The storage device 830 may comprise any appropriate information storage device, including combinations of electronic storage devices, such as, for example, one or more of hard disk drives, optical storage devices, and semiconductor memory devices such as Random Access Memory (RAM) devices and Read Only Memory (ROM) devices.

The storage device 830 can store a program 840 for controlling the processor 810. The processor 810 performs instructions of the program 840, and thereby operates in accordance with software instructions included in the program 840. The processor 810 may also cause the communication device 820 to transmit information, including, in some instances, control commands to operate apparatus to implement the processes described above. The storage device 830 can additionally store related data in a database 830A and database 830B, as needed.

Network Diagram

Figure 9:
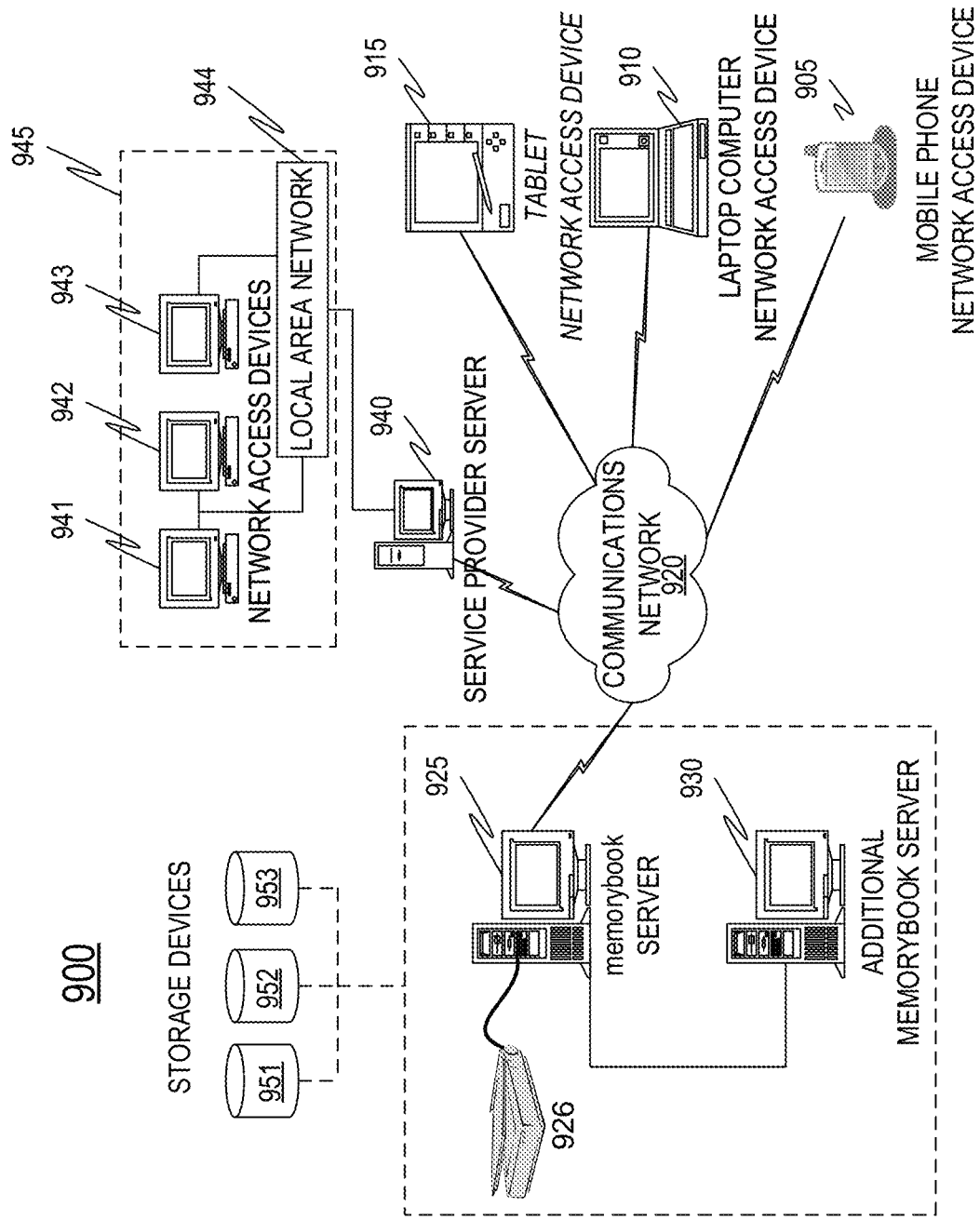
FIG. 9 illustrates a network diagram including a processing and interface system for generated an annotated, virtual Memorybook is illustrated.

Referring now to FIG. 9, a network diagram including a processing and interface system 900 for generating a Memorybook with static image data and Spatial Coordinates. The system 900 may comprise a Memorybook server 940; support servers 925, 930; Memorybook static image and user data storage devices 951, 952, 953; and network access devices 905-915.

An image capture device 926 may provide static image data emulating pages of a memory book volume to the Memorybook Server 925. The Memorybook Server 925 may associate Spatial Coordinates to areas of respective emulated pages of the memory book volume.

The network access devices 905-915 may allow a user to interface with the system 900. In some embodiments, the system 900 may be linked through a variety of networks. For example, a branch of the system, such as the Memorybook provider server 940, may have a separate communication system 945, wherein multiple network access devices 941-943 may communicate through a local area network (LAN) 944 connection. The local network access devices 941-943 may include a tablet, a personal computer, a computer, a mobile phone, a laptop, a mainframe, or other digital processing device.

The Virtual Memorybook server 940 may connect to a separate communications network 920, such as the Internet. Similarly, network access devices 905-915 may connect to the Virtual Memorybook server 940 through a communications network 920. The network access devices 905-915 may be operated by multiple parties.

For example, a tablet network access device 915 may comprise a cellular tablet. A laptop computer network access device 910 may be a personal device owned by an individual User.

Accordingly, the servers 925, 930, 940 and network access devices 905-915 are separate entities for illustrative purposes only. For example, the Virtual Memorybook server 940 may be operated by the SDSP, and the Memorybook servers 925, 930 may be integrated into the Virtual Memorybook server communication system 945. The Virtual Memorybook may also provide a digital assistant network access device 915 to Users. Alternatively, the Virtual Memorybook may only provide the access device 915 to users. In some such aspects, the servers 925, 930, 940 may be operated by a third party or multiple third parties, such as, for example, the manufacturers of the Products carried by the vendor.

Figure 10:
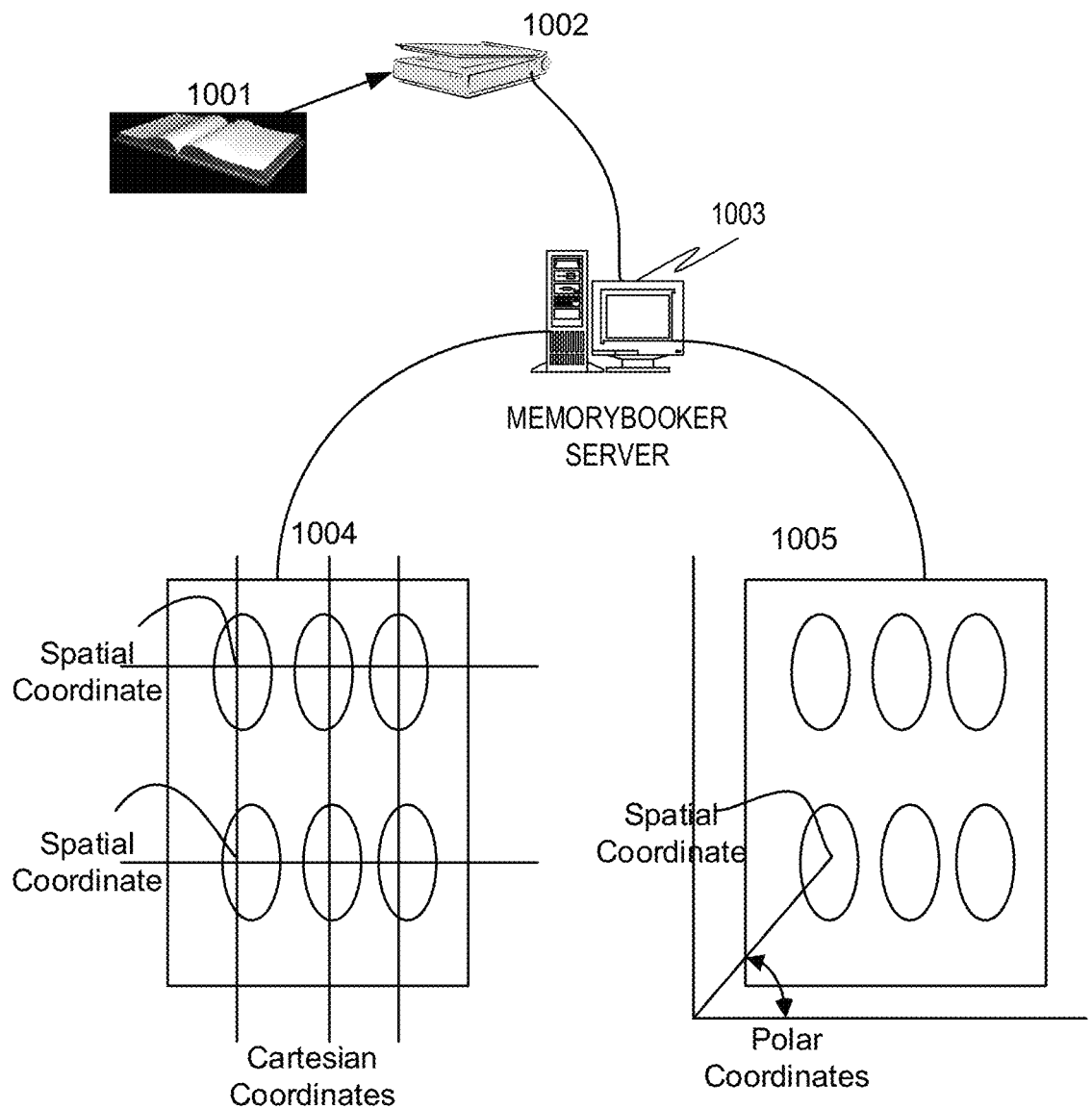
FIG. 10 illustrates a block diagram of an image capture apparatus and associated server.

Referring now to FIG. 10 a block diagram illustrating apparatus for generating a Memorybook is illustrated. A memory book volume 1001, or other media book is converted by a digital image generator 1002. The digital image generator 1002 may include, for example an image capture device that creates a static image of respective pages of the physical memory book. The digital image generator 1002 may operate, by way of non-limiting example based upon charge-coupled device (CCD) input received from the respective pages of the memory book or other physical volume. In some embodiments, static image data, such as a PDF image may be generated based upon electronic input.

A Memorybook Server 1003 may receive the static image data of respective pages of a memory book and correlate areas of the respective pages with Spatial Coordinates 1004-1005. Spatial Coordinates 1004-1005 may include, by way of non-limiting example, one or more of Cartesian Coordinates, such as an X-Y designation' and a Polar Coordinate, such as a point on a plane determined by a distance from a fixed point and an angle from a fixed direction.

The Memorybook Server may then receive Memorybook Entries based upon a page and Spatial coordinate according to the apparatus and methods discussed herein.

Figure 11:
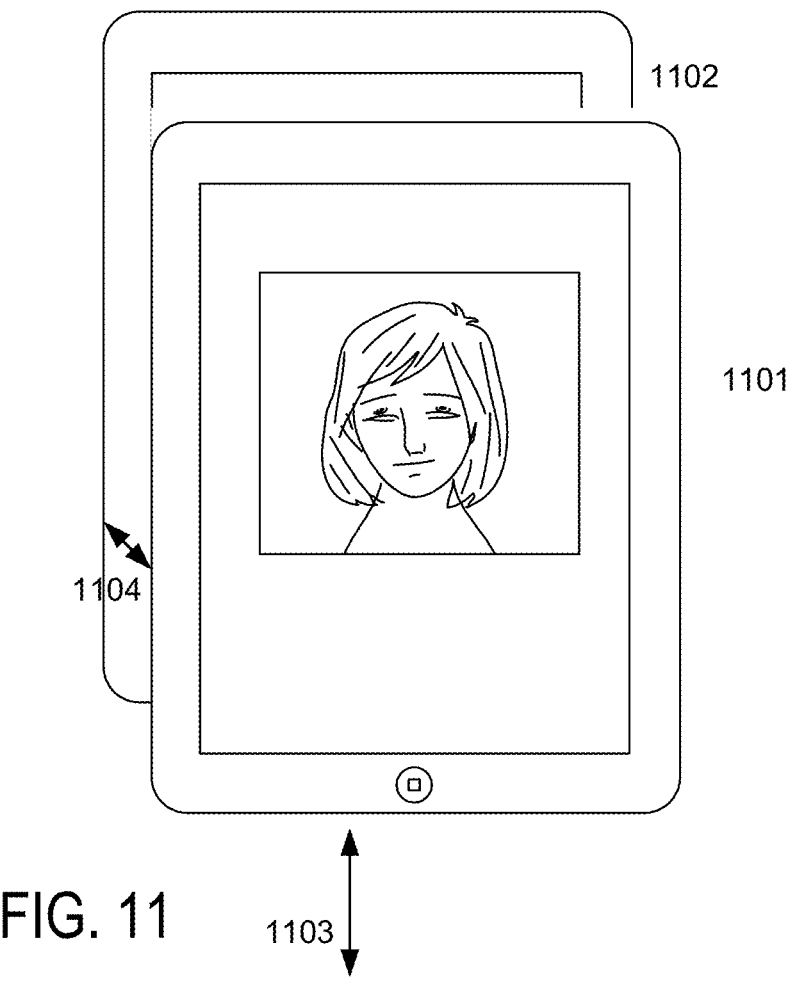
FIG. 11 illustrates apparatus for generating an image for media entry with enhanced depth.

Referring now to FIG. 11, in some embodiments, a Memorybook Entry may include an image of a user making the entry, wherein the image has enhanced depth. Enhanced depth may be generated by taking multiple image captures 1101 and 1102 with each image capture taken at a different distance 1103 and 1104 respectively. Post image capture processing may process the captured image data and generate a post-processed image with enhanced depth.

Additional variations may include a Memorybook Entry with a panorama of image data. The panorama of image data may be captured via multiple image capture events (digital pictures) taken in a general arc type pattern around a subject. Typically, the subject will include a person making a Memorybook entry.

Figure 12:
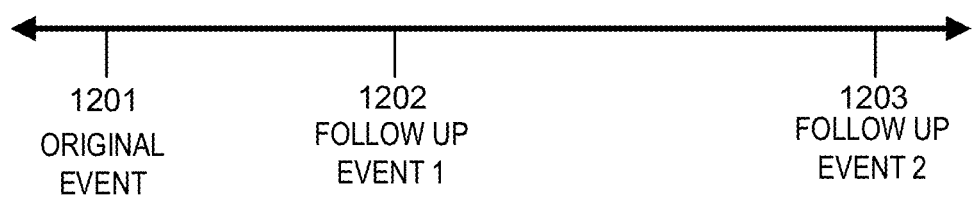
FIG. 12 illustrates a timeline including an original event and one or more follow up events.

Referring now to FIG. 12, in some embodiments, a Memorybook Entry associated with a Spatial Coordinate and page may be periodically appended to with additional media input. For example, a picture of a student taken during a high organization tenure may be accompanied by a picture of the same student at a follow up event. A follow up even may include, by way of example, a high organization reunion, or other event. Some embodiments may also include multiple events 1201-1203 with respective updated Memorybook Entries, which may include the original event 1201 and two follow-up events 1202, 1203.

Referring now to FIG. 13, exemplary method steps and associated dynamic images depicted as animation with a functional description of dynamic capabilities of the imagery. As described above the dynamic imagery may be placed at a location on a static page and be used to convey an emotion or other communication. A device monitors conditions experienced by the device and animates or otherwise activates the dynamic functionality of the dynamic imagery based upon conditions experienced by the device. For example, a tablet type device or a smartphone may include motion sensing circuitry, including, for example a motion coprocessor and one or more accelerometers. In response to sensing motion, a dynamic image may change a state of image and become animated. In another example, a barometer reading may have an image respond as if it were experiencing raining, cloudy or sunny weather conditions. Another example may include a proximity sensor that could detect the presence of a device associated with a particular person and provide a change in imagery based upon the presence of the other person.

Although animation apps may respond to device shakes, and touch, the present disclosure provides for emoticons, avatars, stickers and other digital imagery that may be placed at a static location on a screen by a user or sent from user to user as a "live visual message" and a way to express a feeling or attitude. For example, a superhero sticker may be sent to indicate strength or power, a scientist character to indicate smarts, etc. An image processing apparatus may first generate static image data and corresponding Spatial Coordinates as an infrastructure for receiving media input that includes imagery that becomes dynamic based upon physical conditions experienced by a local device. The static image data may replicate pages of a physical memory book, including for example, a school or corporate yearbook. Memorybook Entries including media input that would generally correlate to a digital "signing" of a Recipient's Memory Book and may include multiple forms of media as opposed to traditional "writing" placed in traditional memory books. As such the media input is generally related to the image data corresponding with selected Spatial Coordinates. Imagery that becomes dynamic based upon physical conditions experienced by a device upon which the imagery is displayed may include, for example, an animation that changes appearance based upon motion, heat, humidity or other physical condition registered by the device controlling display of the imagery.

Physical conditions experienced by the device upon which the imagery is displayed may also include one or more of: interactive movement and visualization of emoticon triggered by hardware sensors including motion coprocessor, accelerometer, gyroscopes, barometer, compasses, GPS, altitude calculations, micro location (beacons), ambient light sensors, proximity sensors, biometric sensors (fingerprint), voice activation, touch-gestures and duration on screen In some embodiments, the present disclosure includes a digital version of a memory book, which may include a school yearbook, that corresponds with an event or time period.

Unlike social media, the Interactive Memorybook provides methods and apparatus to memorialize static images and private communications, essentially recreating a physical volume. In addition, the Interactive Memorybook goes beyond pen and ink as a recording medium and provides for more modern recording mediums, such as, for example, one or more of: a multi view digital image, a selfie with dimensional qualities, a voice over, an audio clip, a video clip, a digital time capsule of information that may only be opened at a later date, and a notification function that communicates to a signer when their message is being viewed.

In the example illustrated, at method step 1301 a kitten image is placed on a user interactive screen as an action or a message on a mobile device which may be hardware enabled. The image may appear static, until environmental data is accessed, whereby an animation is based upon the environmental data accessed by the generating device and/or the displaying device.

At method step 1302 a tilting motion (or other data input) registers with a sensor with the device, such as a tilt to the left which causes an animation of the dynamic image entry, such as a change in the picture to have the cat's eyes keep its eyes on the user.

At method step 1303 in the event that the device is shaken, the dynamic image entry may acknowledge the shake with a change in facial expression.

At method step 1304 in the event that the device is taken outdoors, into another source of bright light, the animation may acknowledge by changing its appearance to include sun glasses.

At method step 1305 in the event that the device is swiped downward on a GUI, the dynamic image entry may be animated to portray affection.

At method step 1306 in the event that interaction with the device ceases, the dynamic image entry may register the cessation of activity by causing the animation to sleep.

Figure 14:
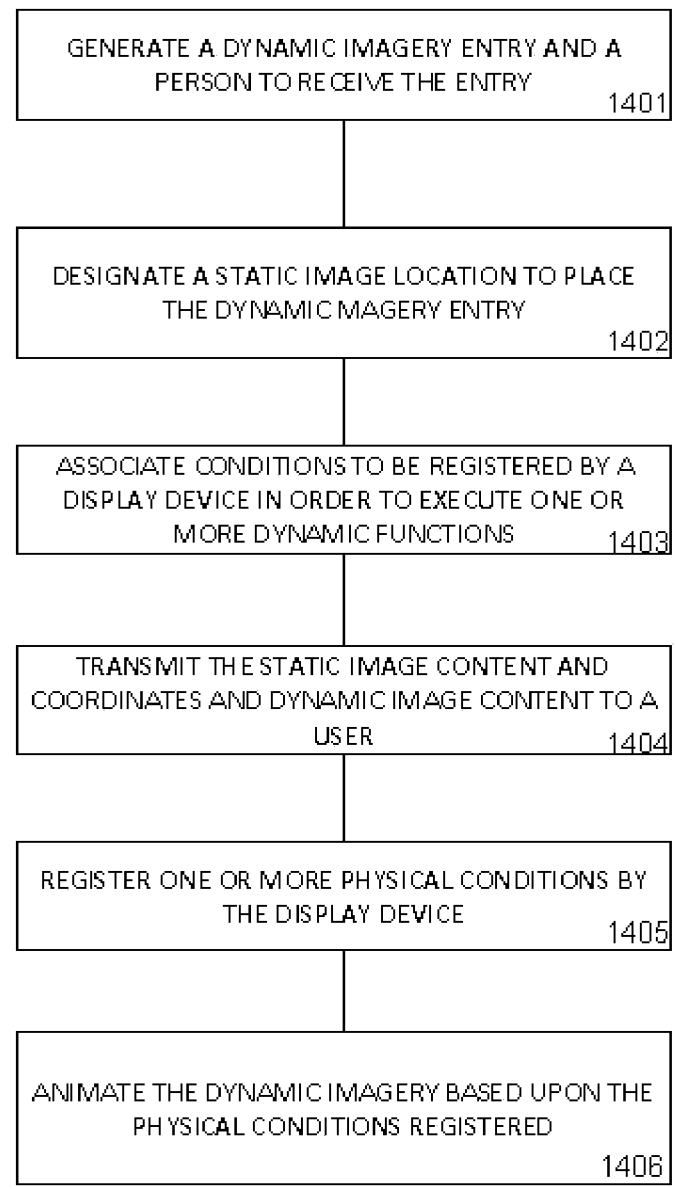
FIG. 14 illustrates method steps that may be performed in some implementations of the present invention.

Referring now to FIG. 14, method steps that may be implemented in some embodiments of the present invention are listed. At method step 1401, a user controlled device may generate a dynamic imagery entry and a person to receive the entry.

At method step 1402, a user controlled device may designate a static image location to place the dynamic imagery entry.

At method step 1403, a user controlled device may associate conditions to be registered by a display device in order to execute one or more dynamic functions.

At method step 1404, a user controlled device may transmit the static image content and coordinate the dynamic image content to a user.

At method step 1405, a user controlled device may register one or more physical conditions by the display device.

At method step 1406, a user controlled device may animate the dynamic imagery based upon the physical conditions registered.

CONCLUSION

A number of embodiments have been described. While this specification contains many specific implementation details, there should not be construed as limitations on the scope of any disclosures or of what may be claimed, but rather as descriptions of features specific to particular embodiments of in some embodiments.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An image generating apparatus for generating an interactive communication based upon a static replication of a hardcopy, the apparatus comprising:
   an image capture device for generating digital image data representative of a plurality of disparate pages of a hardcopy volume, wherein each disparate page of the plurality of disparate pages memorializes a designated page of the hardcopy volume as static image data;
   a server for post processing the digital image data representative of a plurality of pages of the hardcopy volume, said server comprising a processor in logical communication with the image capture device and in logical communication with a smart device via a digital communications network; and executable software stored on the server and executable on demand, the executable software operative with the processor to cause the server to:
- receive the static image data memorializing a first page of the plurality of disparate pages of the hardcopy volume;
- associate a set of Cartesian Coordinates with specific segregated spatial areas of the static image data of the first page of the plurality of disparate pages of the hardcopy volume;
- receive from the smart device operated by a first user the set of Cartesian Coordinates;
- receive from the smart device operated by the first user and via the digital communications network an identification of the first user;
- receive from the smart device operated by the first user and via the digital communications network, a GPS position;
- associate a weather condition with the GPS position on a date of receipt of the receipt of the GPS position;
- generate a dynamic image entry based upon the weather condition associated with the GPS position as a memorybooker entry, the dynamic image entry comprising a moving animation;
- receive from the smart device operated by the first user a designation of a recipient, wherein the recipient is a second user;
- generate a memorybooker interface comprising the dynamic image entry placed over the static image of the first page of the plurality of disparate pages of the hardcopy;
- transmit to a smart device operated by a second user, a second user interface comprising a notification that the memorybooker entry has been received from the first user and an interactive control functional operative to transmit an indication generated by the second user, the interactive control accepting or rejecting the memorybooker entry;
- receive from the smart device operated by the second user an indication accepting the memorybooker entry; and
- based upon receipt of the indication accepting the memorybooker entry, transmit the memorybooker entry to the smart device operated by the second user comprising the media entry designated for the second user by the first user.

2. The apparatus of claim 1 wherein the weather condition on which the dynamic image entry is based upon comprises a location of a device from which the dynamic image entry is initiated.

3. The apparatus of claim 1 wherein the weather condition on which the dynamic image entry is based upon comprises a time registered on a device from which the dynamic image entry is initiated.

4. The apparatus of claim 1 wherein the weather condition on which the dynamic image entry is based upon comprises an acceleration registered on a device from which the dynamic image entry is initiated.

5. The apparatus of claim 1 wherein the weather condition on which the dynamic image entry is based upon comprises a vibration registered on a device from which the dynamic image entry is initiated.

6. The apparatus of claim 1 wherein the weather condition on which the dynamic image entry is based upon comprises a time of year registered on a device from which the dynamic image entry is initiated.

7. The apparatus of claim 1 wherein the weather condition on which the dynamic image entry is based upon comprises a sound level registered on a device from which the dynamic image entry is initiated.

8. The apparatus of claim 1 wherein the weather condition on which the dynamic image entry is based upon comprises a speed of travel registered on a device from which the dynamic image entry is initiated.

9. The apparatus of claim 1 wherein the executable software stored on the server and executable on demand, is additionally operative with the server to cause the apparatus to receive a response from a recipient user to accept the memorybooker entry into a storage as part of a recipient user's memorybooker.

10. The apparatus of claim 1 wherein the executable software stored on the server and executable on demand, is additionally operative with the server to cause the apparatus to receive a subsequent memorybooker entry from the Second User, wherein the subsequent memorybooker entry is correlated with the Cartesian Coordinates.

11. The apparatus of claim 10 wherein the dynamic image entry comprises a moving image of a member of a same organization activity group.

12. The apparatus of claim 10 wherein the dynamic image entry comprises an audio clip.

13. The apparatus of claim 10 wherein the dynamic image entry comprises a video clip.

14. The apparatus of claim 10 wherein the software is additionally operative to transmit an administrator interface to configure the memorybooker interface.

* * * * *